(12) United States Patent
Taylor

(10) Patent No.: US 7,403,946 B1
(45) Date of Patent: Jul. 22, 2008

(54) DATA MANAGEMENT FOR NETCENTRIC COMPUTING SYSTEMS

(75) Inventor: Stanton J. Taylor, Green Oaks, IL (US)

(73) Assignee: Accenture LLP, San Jose, CA (US)

( * ) Notice: Subject to any disclaimer, the term of this patent is extended or adjusted under 35 U.S.C. 154(b) by 807 days.

(21) Appl. No.: 09/677,134

(22) Filed: Sep. 29, 2000

Related U.S. Application Data

(60) Provisional application No. 60/156,962, filed on Oct. 1, 1999.

(51) Int. Cl.
*G06F 17/30* (2006.01)
(52) U.S. Cl. .................. 707/10; 719/330; 709/219; 709/223; 707/4; 707/5; 707/101; 707/104.1
(58) Field of Classification Search ............... 707/101, 707/1–10, 103; 709/217, 218, 219
See application file for complete search history.

(56) References Cited

U.S. PATENT DOCUMENTS

| | | | |
|---|---|---|---|
| 4,809,170 A | 2/1989 | Leblang et al. | 364/200 |
| 5,495,610 A | 2/1996 | Shing et al. | 395/600 |
| 5,535,388 A | 7/1996 | Takeda | 395/650 |
| 5,590,270 A | 12/1996 | Tsukuda et al. | 395/701 |
| 5,602,997 A | 2/1997 | Carpenter | 395/349 |
| 5,619,716 A | 4/1997 | Nonaka et al. | 395/800 |
| 5,710,915 A | 1/1998 | McElhiney | |
| 5,737,533 A | 4/1998 | de Hond | 395/200.49 |
| 5,742,829 A | 4/1998 | Davis et al. | 395/712 |
| 5,745,753 A | 4/1998 | Mosher, Jr. | 395/618 |
| 5,758,150 A | 5/1998 | Bell et al. | 395/610 |

(Continued)

FOREIGN PATENT DOCUMENTS

EP   0520923 A2   12/1992

(Continued)

OTHER PUBLICATIONS

Billy B. L. Lim, "Teaching web development technologies in CS/IS curricula", ACM, copyright 1998, pp. 107-111.*

(Continued)

*Primary Examiner*—Jean M. Corrielus
(74) *Attorney, Agent, or Firm*—Brinks Hofer Gilson & Lione

(57) ABSTRACT

A data management architecture for a netcentric computing system is disclosed by the present invention. The data management architecture includes a plurality of database servers that are in communication with a plurality of data stores to form a distributed data storage system. The distributed data storage system is operably configured within the network of the netcentric computing system to be accessed by a plurality of clients using web servers. The distributed data storage system may comprise a distributed by instance data storage system or a distributed by location data storage system. The data stores within the distributed data storage system each store a predetermined portion of the data for the netcentric computing system. The predetermined portion of the data that is within each of the data stores is determined using a plurality of data distribution strategies. The data distribution strategies provide different ways of segmenting and/or replicating the data to provide efficient and cost effective operation of the netcentric computing system.

31 Claims, 11 Drawing Sheets

U.S. PATENT DOCUMENTS

| | | | |
|---|---|---|---|
| 5,761,071 A | 6/1998 | Bernstein et al. | 364/479.07 |
| 5,781,732 A | 7/1998 | Adams | 395/200.35 |
| 5,799,297 A | 8/1998 | Goodridge et al. | 707/1 |
| 5,805,785 A | 9/1998 | Dias et al. | 395/182.02 |
| 5,835,090 A | 11/1998 | Clark et al. | 345/339 |
| 5,859,969 A | 1/1999 | Oki et al. | 395/200.3 |
| 5,860,012 A | 1/1999 | Luu | 395/712 |
| 5,870,759 A * | 2/1999 | Bauer et al. | 707/201 |
| 5,877,759 A | 3/1999 | Bauer | 345/339 |
| 5,892,905 A | 4/1999 | Brandt et al. | 395/187.01 |
| 5,892,909 A | 4/1999 | Grasso et al. | 395/200.31 |
| 5,905,868 A | 5/1999 | Baghai et al. | 395/200.54 |
| 5,911,071 A | 6/1999 | Jordan | 395/701 |
| 5,924,096 A | 7/1999 | Draper et al. | |
| 5,930,512 A | 7/1999 | Boden et al. | 395/710 |
| 5,933,582 A | 8/1999 | Yamada | 395/114 |
| 5,956,400 A * | 9/1999 | Chaum et al. | 713/167 |
| 5,956,479 A | 9/1999 | McInerney et al. | 395/183.14 |
| 5,999,931 A * | 12/1999 | Breitbart et al. | 707/10 |
| 6,006,171 A | 12/1999 | Vines et al. | 702/184 |
| 6,012,071 A | 1/2000 | Krishna et al. | 707/522 |
| 6,023,698 A | 2/2000 | Lavey, Jr. et al. | 707/10 |
| 6,029,192 A | 2/2000 | Hill et al. | 709/206 |
| 6,038,560 A | 3/2000 | Wical | 707/5 |
| 6,061,695 A | 5/2000 | Slivka et al. | 707/513 |
| 6,067,577 A | 5/2000 | Beard | 709/305 |
| 6,081,518 A | 6/2000 | Bowman-Amuah | 370/352 |
| 6,112,304 A | 8/2000 | Clawson | 713/156 |
| 6,122,630 A * | 9/2000 | Strickler et al. | 707/8 |
| 6,144,975 A | 11/2000 | Harris, Jr. et al. | 707/901 |
| 6,147,975 A | 11/2000 | Bowman-Amuah | 370/252 |
| 6,157,706 A | 12/2000 | Rachelson | 379/100.08 |
| 6,185,573 B1 | 2/2001 | Angelucci et al. | 707/104 |
| 6,195,697 B1 | 2/2001 | Bowman-Amuah | 709/224 |
| 6,256,773 B1 | 7/2001 | Bowman-Amuah | 717/1 |
| 6,289,382 B1* | 9/2001 | Bowman-Amuah | 709/226 |
| 6,321,263 B1 | 11/2001 | Luzzi et al. | 709/224 |
| 6,324,647 B1 | 11/2001 | Bowman-Amuah | 713/201 |
| 6,332,163 B1 | 12/2001 | Bowman-Amuah | 709/231 |
| 6,339,832 B1 | 1/2002 | Bowman-Amuah | 714/35 |
| 6,345,239 B1 | 2/2002 | Bowman-Amuah | 703/6 |
| 6,366,912 B1 | 4/2002 | Wallent et al. | 709/9 |
| 6,370,573 B1 | 4/2002 | Bowman-Amuah | 709/223 |
| 6,385,655 B1 | 5/2002 | Smith et al. | 709/232 |
| 6,401,097 B1 | 6/2002 | McCotter et al. | 707/102 |
| 6,405,364 B1 | 6/2002 | Bowman-Amuah | 717/101 |
| 6,418,430 B1 | 7/2002 | DeFazio et al. | 707/3 |
| 6,426,948 B1 | 7/2002 | Bowman-Amuah | 370/260 |
| 6,427,132 B1 | 7/2002 | Bowman-Amuah | 703/22 |
| 6,434,568 B1 | 8/2002 | Bowman-Amuah | 707/103 |
| 6,434,628 B1 | 8/2002 | Bowman-Amuah | 709/303 |
| 6,438,594 B1 | 8/2002 | Bowman-Amuah | 709/225 |
| 6,442,547 B1 | 8/2002 | Bowman-Amuah | 707/10 |
| 6,442,748 B1 | 8/2002 | Bowman-Amuah | 717/3 |
| 6,449,588 B1 | 9/2002 | Bowman-Amuah | 703/21 |
| 6,457,066 B1 | 9/2002 | Mein et al. | 709/330 |
| 6,477,580 B1 | 11/2002 | Bowman-Amuah | 709/231 |
| 6,477,665 B1 | 11/2002 | Bowman-Amuah | 714/39 |
| 6,496,850 B1 | 12/2002 | Bowman-Amuah | 709/203 |
| 6,502,213 B1 | 12/2002 | Bowman-Amuah | 714/49 |
| 6,523,027 B1* | 2/2003 | Underwood | 707/4 |
| 6,529,909 B1 | 3/2003 | Bowman-Amuah | 707/10 |
| 6,529,948 B1* | 3/2003 | Bowman-Amuah | 709/217 |
| 6,539,396 B1 | 3/2003 | Bowman-Amuah | 707/103 |
| 6,542,593 B1 | 4/2003 | Bowman-Amuah | 379/201.03 |
| 6,549,949 B1 | 4/2003 | Bowman-Amuah | 709/236 |
| 6,550,057 B1 | 4/2003 | Bowman-Amuah | 717/126 |
| 6,556,659 B1 | 4/2003 | Bowman-Amuah | 379/9.04 |
| 6,571,282 B1 | 5/2003 | Bowman-Amuah | 709/219 |
| 6,578,068 B1 | 6/2003 | Bowman-Amuah | 709/203 |
| 6,584,466 B1 | 6/2003 | Serbinis et al. | 707/10 |
| 6,598,046 B1 | 7/2003 | Goldberg et al. | 707/5 |
| 6,601,192 B1 | 7/2003 | Bowman-Amuah | 714/38 |
| 6,601,234 B1 | 7/2003 | Bowman-Amuah | 717/108 |
| 6,606,660 B1 | 8/2003 | Bowman-Amuah | 709/227 |
| 6,606,744 B1 | 8/2003 | Mikurak | 717/174 |
| 6,611,867 B1 | 8/2003 | Bowman-Amuah | 709/224 |
| 6,615,199 B1 | 9/2003 | Bowman-Amuah | 706/50 |
| 6,615,253 B1 | 9/2003 | Bowman-Amuah | 709/219 |
| 6,615,258 B1 | 9/2003 | Barry et al. | 709/223 |
| 6,636,242 B2 | 10/2003 | Bowman-Amuah | 345/764 |
| 6,640,238 B1 | 10/2003 | Bowman-Amuah | 709/201 |
| 6,640,244 B1 | 10/2003 | Bowman-Amuah | 709/207 |
| 6,640,249 B1 | 10/2003 | Bowman-Amuah | 709/228 |
| 6,662,357 B1 | 12/2003 | Bowman-Amuah | 717/120 |
| 6,697,824 B1 | 2/2004 | Bowman-Amuah | 707/229 |
| 6,704,303 B1 | 3/2004 | Bowman-Amuah | 370/352 |
| 6,707,812 B1 | 3/2004 | Bowman-Amuah | 370/353 |
| 6,715,145 B1 | 3/2004 | Bowman-Amuah | 718/101 |
| 6,721,713 B1 | 4/2004 | Guheen | 705/1 |
| 6,742,015 B1 | 5/2004 | Bowman-Amuah | 709/101 |
| 6,745,209 B2* | 6/2004 | Holenstein et al. | 707/203 |
| 6,874,010 B1 | 3/2005 | Sargent | 709/203 |
| 6,988,249 B1 | 1/2006 | Arvanitis et al. | 715/853 |
| 7,020,697 B1 | 3/2006 | Goodman et al. | 709/223 |
| 7,068,680 B1 | 6/2006 | Kaltenmark et al. | 370/469 |
| 2001/0052108 A1 | 12/2001 | Bowman-Amuah | 717/1 |
| 2002/0120553 A1 | 8/2002 | Bowman-Amuah | 705/37 |
| 2002/0133328 A1 | 9/2002 | Bowman-Amuah | 703/22 |
| 2003/0058277 A1 | 3/2003 | Bowman-Amuah | 345/765 |
| 2004/0030705 A1 | 2/2004 | Bowman-Amuah | 707/100 |
| 2004/0030749 A1 | 2/2004 | Bowman-Amuah | 709/204 |
| 2005/0283518 A1 | 12/2005 | Sargent | 709/201 |
| 2006/0059253 A1 | 3/2006 | Goodman et al. | 709/223 |

FOREIGN PATENT DOCUMENTS

| | | |
|---|---|---|
| EP | 0697655 A2 | 2/1996 |
| EP | 0697691 A2 | 2/1996 |
| EP | 0769739 A2 | 4/1997 |
| EP | 0810520 A1 | 12/1997 |
| EP | 0829808 A2 | 3/1998 |
| EP | 0841616 A2 | 5/1998 |
| EP | 0915422 A1 | 5/1999 |
| GB | 2315891 A | 2/1998 |
| WO | WO 92/20022 | 11/1992 |
| WO | WO 95/23373 | 8/1995 |
| WO | WO 97/12311 | 4/1997 |
| WO | WO 98/52121 | 11/1998 |
| WO | WO 98/53396 | 11/1998 |
| WO | WO 98/54660 A2 | 12/1998 |
| WO | WO 98/57260 | 12/1998 |
| WO | WO 99/38079 | 7/1999 |

OTHER PUBLICATIONS

Litoiu et al., "A performance engineering tool and method for distributed applications", ACM, pp. 1-14.*

Zoller et al., "A toolkit for an automatic, data dictionary based connection of databases to the WWW", ACM, copyrithed 1998, pp. 706-718.*

McDowell et al., "Unloading Java classes that contain Static fields", ACM, v.33(1), Oct. 15, 1997, pp. 56-60.*

Tilley et al., "Net-centric computing system", Special report, Oct. 1997.*

Lavva et al., "Object management for Network centric systems with mobile objects".*

Net-centric computing:Architecting a distributed data management infractucture.*

Bernard Cole "What is net-centric computing", Mar. 15, 2001.*

Bernard Cole XP and net-centric computing, Sep. 2001.*

Hugh et al., "Net-Centric computing".*

Meisi et al., "Parallel Synthetic aperture radar processing on workstation", IEEE, Apr. 15-19, 1996.*

Robert D. Schneider, Horizontal and vertical partioning, Microsoft Tech. ED, Jun. 4-8, 20073.*

Agrawal et al., "Integrated Vertical and horizontal partitioning into automated physical database design", ACM, pp. 359-370, Jun. 13-18, 2004.*

Ryan, H.W., Sargent, S.R., Boudreau, T.M., Arvanitis, Y.S., Taylor, S.J., Mindrum, C.; "Practical Guide to Client/Server Computing," Second Edition, pp. 1-774; Copyright 1998, CRC Press LLC, Boca Raton, FL, United States.

Ryan, H.W.; Alber, M.W.; Taylor, S.J.; Chang, R.A.; Arvanitis, Y.S.; Davis, M.C.; Mullen, N.K.; Dove, S.L.; Mehra, P.N.; Mindrum, C.; "Netcentric Computing, Computing, Communications and Knowledge," pp. 1-413; Copyright 1998, CRC Press LLC Boca Raton, FL, United States.

Orfali, R., Harkey, D., "Client/Server Programming with OS/2 2.0 (2nd Ed.)" 1992, Van Nostrand Reinhold New York, U.S., pp. 10-24, 111-137, 149-160, 588-594, XP002164217, ISBN 0-442-01219-5.

Orfali, R., Harkey, D., Edwards, J., "Intergalactic Client/Server Computing," Byte, McGraw-Hill, Inc., St. Peterborough, U.S., vol. 20, No. 4, Apr. 1, 1995, pp. 108-110, 114, 11, XP000501823, ISSN: 0360-5280.

Smeets, J., Boyer, S., "Internet and Client Server Patent Information Systems: New Services from Derwent," World Patent Information, GB, Elsevier Sciences Publishing, Barking, vol. 20, No. 2, Jun. 1998, pp. 136-139, XP004165804, ISSN 0172-2190.

Orfali, R., Harkey, D., "Client/Server With Distributed Objects," Byte, McGraw-Hill, Inc., St. Peterborough, U.S., vol. 20, No. 4, Apr. 1, 1995, pp. 151-152, 154, 156, XP000501827, ISSN 0360-5280.

Aoyama, M., Hanai, Y., Suzuki, M., "An Integrated Software Maintenance Environment: Bridging Configuration Management and Quality Management," Proceedings of the Conference on Software Maintenance, International Conference on Software Maintenance, Washington, US, IEEE Computer Society Press, Oct. 24, 1988 pp. 40-44.

Borsook, P., "Seeking Security. Mainframe Techniques Define System Security. Soon, they'll be Adapted To Distributed Client/Server Systems." Byte, McGraw-Hill, Inc., St. Peterborough, vol. 18, No. 6, May 1, 1993, pp. 119-122, 124, 12, XP000359327, ISSN 0360-5280.

Tanenbaum, A., "Computer Networks—Third Edition," Prentice-Hall International, London, GB, 1996, pp. 28-39, XP002161723.

Blakeley, J.A., "Universal Data Access with OLE DB," Proceedings of IEEE Compcon, U.S. Los Alamitos, IEEE Computer Society Press, Feb. 23, 1997, pp. 2-7.

IBM Technical Disclosure Bulletin, "Security, License Management and Application Metering Process for Controlling Applications in the DOS Environment," IBM Corp., New York, US, vol. 37, No. 11, pp. 195-199, Nov. 1, 1994.

Voth, G.R., Kindel, C., Fujioka, J., "Distributed Application Development for Three-Tier Architectures: Microsoft on Windows DNA," IEEE Internet Computing vol. 2, No. 2, Mar./Apr. 1998, USA.

Lambert, N., "A New Patent Search Tool For The Internet. Q-PAT US." Database, US, Cincinnati, vol. 19, No. 4, Aug. 1, 1996.

Abdel-Mottaleb, M., Hsiang-Lung, W., Dimitrova, N., "Aspects of Multimedia Retrieval," Philips Journal of Research, NL, Elsevier, Amsterdam, vol. 50, No. 1, 1996, pp. 227-251.

Olson, M.A., "DataBlade extensions for INFORMIX-Universal Server," Compcon '97 Proceedings, IEEE, 1997, pp. 143-148.

Chamberlin, D.D., "Evolution of Object-Relational Database Technology in DB2," Compcon '97 Proceedings, IEEE, 1997, pp. 131-135.

Nori, A.K., Kumar, S., "Bringing Objects to the Mainstream," Compcon '97 Proceedings, IEEE, 1997, pp. 136-142.

"Data Joiner: A Multidatabase Server Version 1," White Paper, IBM Data Management Solutions, IBM, USA, second edition (May 1995).

"Effective Systems management for DB2 Universal Database," White Paper, IBM Data Management Solutions, IBM, USA, first edition (Dec. 1996).

Pleas, K., "Ole's Missing Links," BYTE, McGraw-Hill Inc., St. Peterborough, US, vol. 21, No. 4, Apr. 1, 1996, pp. 99-102 X-000586036, ISSN 0360-5280.

Burke, M.G., Choi, J.D., Fink, S., Grove, D., Hind, M., Sarkar, V., Serrano, M.J., Sreedhar, V.C., Srinivasan, H., "The Jalapeno Dynamic Optimizing Compiler for Java," Java '99, San Francisco, CA, US, ACM Jun. 12, 1999, pp. 129-141 XP002134655.

Cramer, T., Friedman, R., Miller, T., Seberger, D., Wilson, R., Wolczko, M., "Compiling Java Just in Time," IEEE Micro, IEEE Inc., New York, US, vol. 17, No. 3, May 1, 1997, pp. 36-43 XP000656035, ISSN: 0272-1732.

Bank, J.S., "Java Security," Dec. 8, 1995, pp. 1-13, X-002092325.

Koved, L., Nadalin, A.J., Neal, D., Lawson, T., "The Evolution of Java Security," IBM, The Ultimate Resource for Java Developers, 1998, pp. 1-14, XP002144222.

Touch, J. Hughes, A.S., "LSAM proxy cache: a multicast distributed virtual cache," Computer Networks and ISDN Systems, North Holland Publishing, Amsterdam, NL (3W3 Workshop, University of Manchester, Jun. 15-17, 1998), vol. 30, No. 22-23, Nov. 25, 1998, pp. 22-23.

Clip, P., "Servlets: CGI The Java Way," BYTE, McGraw-Hill, Inc., St. Peterborough, US, vol. 23, No. 5, May 1, 1998, pp. 55-56.

Gwertzman, J.S., Seltzer, M., "The Case For Geographical Push-Caching," Workshop on Hot Topics in Operating Systems, May 4, 1995, pp. 51-55.

Chamberlin, D.D., "Using the new DB2: IBM's object-relational database system," Morgan Kaufmann Publishers, USA, 1996, ISBN 1-55860-373-5, pp. 561-567.

North, K., "Database Programming with OLE and ActiveX," DBMS, US M&T Publ., Redwood City, CA, US, Nov. 1996, pp. 1-8.

Joshi, S.M., Veeramani, D., "Book Review. Increasing the Interoperability of CAD Packages. CAD and Office Integration: OLE for Design and Modeling—A New Technology for CA-Software," Computer Aided Design, Elsevier Publishers BV, Barking, GB, vol. 29, No. 12, Dec. 1, 1997, pp. 907

Schmoll, J. "Wird OLE for Process Control (OPC) Ein Neuer Industriestandard?", Automatisierungstechnische Praxis, ATP, Oldenbourg Verlag, Munchen, DE, vol. 39, No. 5, May 1, 1997, pp. 11-12, 14-17.

Williams, S., Kindel, C., "The Component Object Model. The Foundation for OLE Services," Dr. Dobb's Special Report. Winter, 1994/95, vol. 19, No. 16, Dec. 21, 1994 pp. 14-22.

Smith, D., Tilley, S.R., Weiderman, N.H., "Transforming Legacy Application into Object-Oriented Applications Workshop, Will Net-Centric Computing Change the Reengineering Equation?" 1996, pp. 1-4.

Hamilton, M.A., "Java and the shift to Net-centric computer," Sun Microsystems, Computer, paper published Aug. 1996, ISSN: 0018-9162, Aug. 1996, pp. 31-39.

Copyright Registration for Netcentric Computing: Computing, Communications and knowledge, Reg. 9 Jan. 1998, p. 1.

Kramer, D., The Java™ Platform: A White Paper, JavaSoft, pp. 1-25, May 1996.

www.empowermentzone.com/javacomp.txt, Sun Microsystems, pp. 1-18, 1996.

Raje, R. and Chinnasamy, S., "Designing a distributed computing environment for global scale systems: challenges and issues," ACM SIGAPP Applied Computing Review, vol. 7, Issue 1, Spring 1999, pp. 25-30.

Morris, K.C. and Flater, D., "Standards-based software testing in a Net-Centric World" pp. 1-8 (cited by Examiner, no date given).

Engestrom, J., "Software Agents, Towards Transparent Mediation, A Technology Report for Salama Interactive," Jan. 1999, pp. 1-19.

Co-pending U.S. Appl. No. 09/386,917, filed Aug. 31, 1999; 340 pages, Inventor Michael K. Bowman-Amuah.

Co-pending U.S. Appl. No. 10/647,411, filed Aug. 25, 2003; 22 pages, Inventor Michael K. Bowman-Amuah.

Co-pending U.S. Appl. No. 09/387,654, filed Aug. 31, 1999: 818 pages, Inventor Michael K. Bowman-Amuah.

* cited by examiner

DATA MANAGEMENT FOR NETCENTRIC COMPUTING SYSTEMS

This application claims the benefit under 35 U.S.C. §119 (e) of U.S. provisional application Ser. No. 60/156,962 filed on Oct. 1, 1999. In addition, the following commonly owned patent(s) and patent application(s) are related to this application: U.S. Pat. No. 6,874,010, issued Mar. 29, 2005, entitled BASE SERVICE ARCHITECTURES FOR NETCENTRIC COMPUTING SYSTEMS; U.S. Pat. No. 6,988,249, issued Jan. 17, 2006, entitled PRESENTATION SERVICE ARCHITECTURES FOR NETCENTRIC COMPUTING SYSTEMS; U.S. Pat. No. 7,020,697, issued Mar. 28, 2006, entitled ARCHITECTURES FOR NETCENTRIC COMPUTING SYSTEMS; U.S. Pat. No. 7,068,680, issued Jun. 27, 2006, entitled COMMUNICATION SERVICE ARCHITECTURES FOR NETCENTRIC COMPUTING SYSTEMS; and U.S. patent application Ser. No. 09/676,584, filed Sep. 29, 2000, entitled OPERATIONS ARCHITECTURES FOR NETCENTRIC COMPUTING SYSTEMS.

FIELD OF THE INVENTION

The present invention relates generally to business computing systems, and more particularly to methods and systems of performing netcentric computing.

BACKGROUND OF THE INVENTION

Computer based business solutions have existed for various different types of transactions since the mid-to-late 1960s. During this time period, the technology focused on the use of batch technology. In batch processing, the business user would present a file of transactions to the application. The computer system would then run through the transactions, processing each one, essentially without user intervention. The system would provide reporting at some point in the batch processing. Typically, the reports would be batch printed, which in turn, would be used by the business user to correct the input transactions that were resubmitted along with the next batch of transactions.

In the 1970s, businesses began a transition to on-line, interactive transactions. At a conceptual level, this processing opened up the file of transactions found in batch transactions and allowed the user to submit them one at a time, receiving either immediate confirmation of the success of the transaction or else feedback on the nature of the transaction error. The conceptually simple change of having the user interact with the computer on a transaction-at-a-time basis caused huge changes in the nature of business computing. More important, users saw huge changes in what they could do on a day-to-day basis. Customers were no longer forced to wait for a batch run to process the particular application. In essence, the computer had an impact on the entire work flow of the business user.

Along with the advent of on-line interactive systems, it was equally significant that the systems provided a means for the business user to communicate with others in the business as the day-to-day business went along. This capability was provided on the backbone of a wide area network (WAN). The WAN was in itself a demanding technology during this time period and because of these demands telecommunications groups emerged within organizations, charged with the responsibility to maintain, evolve, and manage the network over a period of time.

The theme of the 1980s was database management systems (DBMSs). Organizations used and applied database technology in the 1970s, but in the 1980s they grew more confident in the application of DBMS technology. Because of the advances in network technology, the focus was now on the sharing of data across organizational and application boundaries. Curiously, database technology did not change the fundamental way in which business processing was done. DBMS made it more convenient to access the data and to ensure that it could be updated while maintaining the integrity of the data.

In the 1990s, technology began to shift toward client/server computing. Client/server computing is a style of computing involving multiple processors, one of which is typically a workstation, and across which a single business transaction is completed. Using the workstation, the transaction entered by the user could now be processed on a keystroke-by-keystroke basis.

Furthermore, there was a change in the communications. With client/server, users could communicate with others in the work group via a local area network (LAN). The LAN permitted workstation-to-workstation communications at speeds of 100 to 1,000 times what was typically available on a WAN. The LAN was a technology that could be grown and evolved in a local office with little need for direct interaction from the telecommunications group.

During the late 1990s, the Internet began to receive widespread use by consumers and businesses. In the business world, the Internet has caused the concept of business users to expand greatly because of the way in which computers are now capable of being interconnected, which is made possible by the Internet. In addition, the cost of computers has dropped to the point that it is affordable for almost every household to own a computer if they so desire. As such, a need to expand the reach of computing both within and outside the enterprise, and that enables the sharing of data and content between individuals and applications has developed.

SUMMARY OF THE INVENTION

The presently preferred embodiments disclose a data management architecture for use in a netcentric computing system. The data management architecture comprises a distributed data storage system that utilizes a plurality of database servers. The database servers include a plurality of data stores that store the data utilized within the netcentric computing system. Each of the data stores is in communication with one of the database servers, and the database servers are operable to access the data stores. Clients within the netcentric computing system access the data using webservers. The webservers act as the primary interface between the clients and the database servers. Communication within the netcentric computing system occurs within a network. The network comprises a plurality of LAN connections, a plurality of intranet connections and a plurality of Internet connections. Access by the clients to the netcentric computing system may also be obtained using a dial-up modem or other similar connection mechanism.

Data distribution within the netcentric computing system may be determined based on business transactions that identify the data needs of a plurality of data entity groups. The data entity groups comprise the clients within the netcentric computing system. The data needs of the data entity groups may be identified as predetermined portions of the data within the netcentric computing system. The predetermined portions of the data can be distributed within the netcentric computing system among the database servers such that the data entity groups can access the data by interfacing with the database servers using the webservers.

The distributed data storage system of the presently preferred embodiments can be a distributed by instance data storage system or a distributed by location data storage system. The distributed by instance data storage system is characterized by a plurality of database servers that are physically located in a single geographic location. Conversely, the distributed by location data storage system includes database servers that are located at multiple geographic locations. In both the distributed by instance and the distributed by location data storage systems, the data used by the netcentric computing system is distributed among the database servers. The data distribution strategies utilized by the presently preferred embodiments include a segmented data distribution system and a replicated data distribution system.

The segmented data distribution system involves partitioning the data within the netcentric computing system into predetermined portions referred to as segments. The segmentation strategy includes vertical segmentation and horizontal segmentation. Horizontal segmentation partitions the data such that rows of the data may be segmented into groups to form databases. Each of the databases is stored in one of the data stores that are associated with the data servers. Vertical segmentation similarly partitions the data of the netcentric computing system into databases that are stored in the data stores. In vertical segmentation, the columns of the data are segmented into groups to form the databases. Within the segmentation strategy, the data is distributed by determining a plurality of segmentation parameters. The data that is segmented based on the segmentation parameters resides in the data stores that are accessed by the database servers. The database servers are selectively accessed depending on data requests generated within the netcentric computing system.

The replicated data distribution system includes a central database server located at a central site and a central data store in communication with the central database server. In addition, the replicated data distribution system includes a local database server located at a local site that is in communication with the central database server. The local data base server is in communication with a local data store. The local data store is populated with replica data that is a replica of the data within the central data store. The replicated data distribution strategy is operable to replicate a predetermined portion of the data within the central data store to create replica data. The replica data is transferred to a corresponding local database using the network. The data and the replica data are accessed by the clients using the network and the webserver.

The data in the central database and local database are updated. In one presently preferred embodiment, the data is updated unidirectionally. Unidirectional updates are changes to the data that are made to the central database and the replica data containing the updates is transferred to the local database. In another presently preferred embodiment, the data is updated bi-directional such that changes to the data can be made at the central database or at the local database. The changes to the data are then transferred to the central database or the local database depending on where the changes were made.

The presently preferred data distribution strategies provide the netcentric computing system with a data management system that can meet the business requirements of an enterprise. The data distribution strategies enable the sharing of data and content both within and outside of an enterprise. The segmentation and replication strategies provide solutions to data distribution that may allow cost effective and efficient operation of the netcentric computing system. In addition, the strategies are capable of providing for future expansion and the implementation of additional business requirements to meet the needs of the clients within the netcentric computing system. Further objects and advantages of the present invention will be apparent from the following description, reference being made to the accompanying drawings wherein preferred embodiments of the present invention are clearly shown.

DETAILED DESCRIPTION OF THE PRESENTLY PREFERRED EMBODIMENTS OF THE INVENTION

The presently preferred embodiments disclose data management strategies used in a netcentric computing environment. Netcentric is an architecture style and an evolutionary stage of client/server computing which expands the reach of computing both within and outside an enterprise by enabling the sharing of data and content between individuals and applications. Netcentric uses applications that provide capabilities to publish, interact or transact using Internet technologies to connect employees, customers and business partners.

Figure 1:
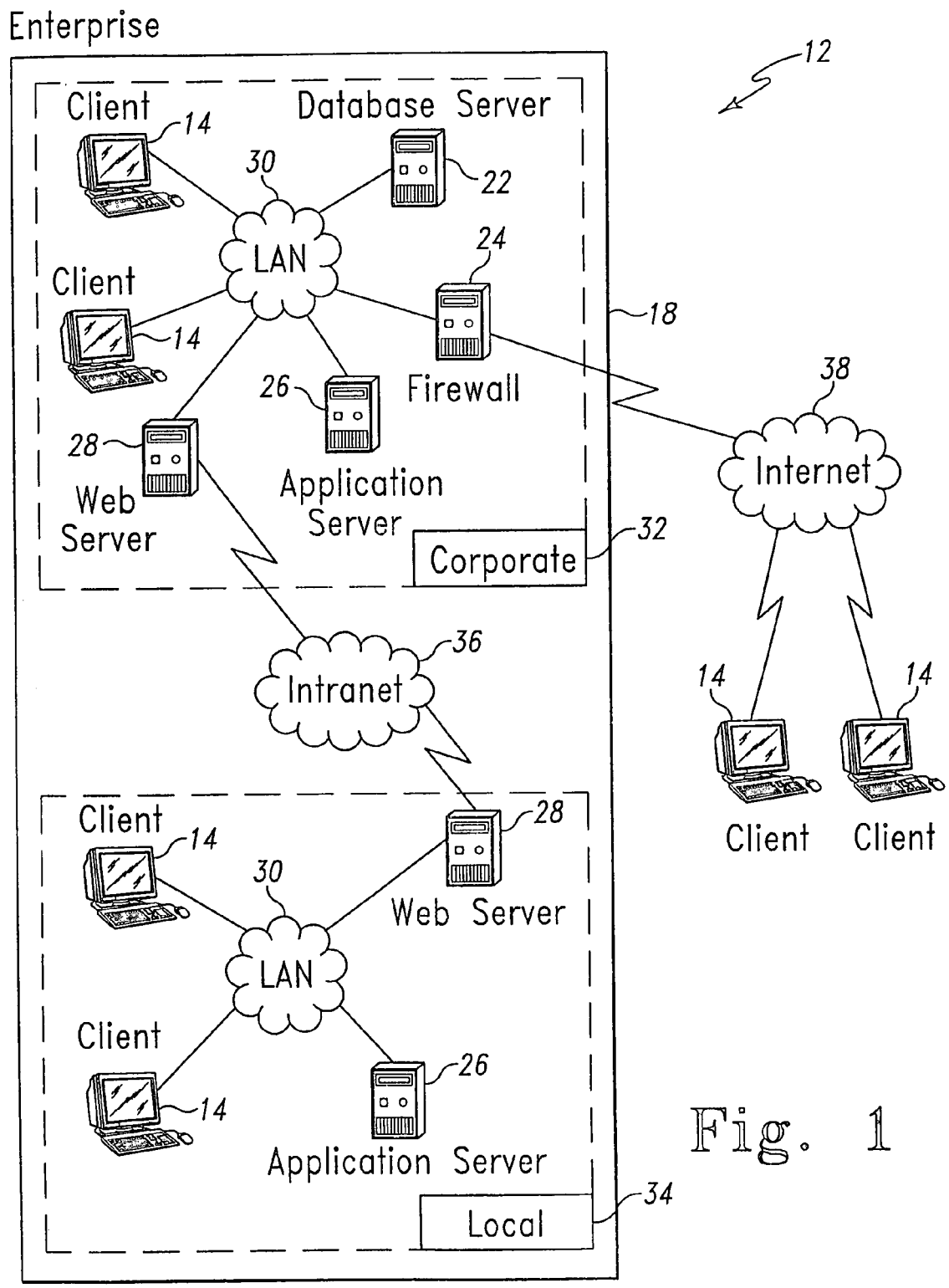
FIG. 1 is an illustrative example of a presently preferred netcentric computing system.

FIG. 1 is an example embodiment of a netcentric computing system 12 that includes at least one client 14 that is connected with at least one server 22, 26, 28. The client 14 includes employees, customers, business partners and other users of the netcentric computing system 12. In this example embodiment, a business enterprise 18 includes at least one client 14, at least one database server 22, at least one firewall 24, at least one application server 26, at least one web server 28 and a local area network (LAN) connection 30, which are electrically connected as illustrated in FIG. 1.

As generally known in the art, LAN connections 30 are comprised of software applications and various computing devices (network cards, cables, hubs, routers, etc.) that are used to interconnect various computing devices (i.e. —clients 14 and servers 22, 26, 28) that are located at a first business enterprise location 32 to form a network at that location. The term LAN connection 30, as used herein, should be broadly construed to include any and all hardware and software applications that allows clients 14, servers 22, 26, 28 or other computing devices to be electrically connected together to share and transfer data. Although not illustrated, other devices such as printers may be connected with the LAN connection 30 so that the resource is available to users of the network. Those skilled in the art would recognize that various types of LAN connections 30 exist and may be used in the presently preferred embodiments.

The firewall 24 is used to isolate internal systems from unwanted intruders. In particular, firewalls 24 isolate the web servers 28 from all Internet traffic that is not relevant to the netcentric computing system 12. In the preferred embodiment, the only requests allowed through the firewall 24 are for services located on the web servers 28. All requests for other applications (e.g., FTP, Telnet) and other IP addresses that the netcentric computing system 12 receives are typically blocked by the firewall 24 during operation of the netcentric computing system 12.

The presently preferred web servers 28 are the primary interface to the clients 14 for all interactions with the applications or services that are provided by the netcentric computing system 12. The main task of the web servers 28 is to authenticate the clients 14, establish a secure connection from the clients 14 to the web servers 28 using encrypted messages, and allow applications the clients 14 are using to transparently access the resources of the netcentric computing system 12. The web servers 28 are responsible for accepting incoming HTTP (Hypertext Transfer Protocol) messages and fulfilling the requests. For dynamic HTML (Hypertext Markup Language) page generation, requests are forwarded to the application servers 26. During operation, static pages, such as help pages, may be preferably generated entirely by the web servers 28.

In the presently preferred embodiment, the primary function of the application servers 26 is to provide a link through which the web servers 28 can interact with the clients 14, trigger business transactions, and send back resulting data to the clients 14. A fundamental role of the application servers 26 is to manage the logical flow of transactions and keep track of the state of sessions. The application servers 26 are also responsible for managing all sessions within the netcentric computing system 12. A session is a period of time in which a client 14 is interacting with, and using, a resource of the netcentric computing system 12.

As further illustrated in FIG. 1, a second business enterprise location 34 may be connected with the first business enterprise location 32 using an intranet connection 36. Those skilled in the art would recognize that various intranet connections 36 exist and may be used in the presently preferred embodiments. The intranet connection 36 allows the computing resources of the second business enterprise location 34 to be shared or connected with the computing resources available at the first business enterprise location 32. The term intranet connection 36, as used herein, should be broadly construed to include communication devices and software applications as well as various other connection devices used to physically interconnect two or more business networks. Although not illustrated, other enterprise locations, each containing its own computing resources, may be connected with the netcentric computing system 12 using other intranet connections 36.

In the example embodiment illustrated in FIG. 1, the firewall 24 of the first business enterprise location 32 is connected by an Internet connection 38 with clients 14 that are located remotely from the enterprise location 32. The clients 14 that are connected with the Internet connection 38 preferentially access data and communicate with the services of the netcentric computing system 12 through the Internet connection 38 using web browser applications that are located and running on the clients 14. The Internet connection 38 gives the clients 14 the ability to gain access to applications, information and data content that may be located on the database server 22, the application server 26 and the web server 28, preferably by means of the web server 28.

As used herein, the term Internet connection 38 should be broadly construed to include any software application and hardware device that is used to connect the clients 14 and the servers 22, 26 28 with an Internet service provider (not illustrated) that establishes the connection to the Internet. Those skilled in the art would recognize that the clients 14 and the servers 22, 26 28 may establish the Internet connection 38 with the Internet service provider using modems, cable modems, ISDN connections and devices, DSL connections and devices, fiber optic connections and devices, and satellite connections and devices to name a few. For the purpose of the presently preferred embodiments, it is important to understand that the clients 14 and servers 22, 26, 28 are connected with one another through the Internet connection 38.

For a detailed discussion of the elements of the netcentric computing systems 12, refer to co-pending U.S. patent application Ser. No. 09/676,227 entitled ARCHITECTURES FOR NETCENTRIC COMPUTING SYSTEMS, which was filed on Sep. 29, 2000 and is hereby incorporated by reference, in its entirety.

In the presently preferred embodiments, one purpose of the database servers 22 is to handle an application log. All requests sent to the web servers 28 and application servers 26, as well as their respective responses, are logged in the application log. The application log is preferentially used for tractability. In the preferred embodiment, requests are logged in the application log directly by the application server 26. Those skilled in the art would recognize that any number of data items may be monitored and kept track of in the application log.

Another function of the database server 22 is to store, maintain and provide the data for the netcentric computing system 12. Data in the netcentric computing system 12 comprises information that fulfills the business requirements of the enterprises 32, 34 and the clients 14. The data may be communicated to the clients 14 from the database server 22 during processing within the netcentric computing system 12 using the application servers 26 and the web servers 28. The data that is used during processing within the netcentric computing system 12 may be centralized or distributed. FIG. 1 illustrates an example of a centralized data approach in which data resides within the database server 22 at the first business enterprise location 32. Alternatively, data that is distributed within the netcentric computing system 12 may reside within a number of different database servers 22 that may be in a number of different locations.

Distributed data is defined as data that is physically located separate from the application processing, or that is spread among two or more database servers 22, which then must be kept coordinated. Distributed data can be spread over multiple sites or multiple database servers 22 in whatever manner best supports the business application processing requirements. In the discussion of the presently preferred distributed data strategies herein, terms may be used that are specific to relational databases—for example, "rows" instead of "records." However, those skilled in the art would recognize that these strategies could be applied to data stored in any format. In addition, those skilled in the art would understand that there is a spectrum of possibilities and variations of distribution between fully centralized data and distributed data that may utilize the distributed data strategies disclosed.

Figure 2:
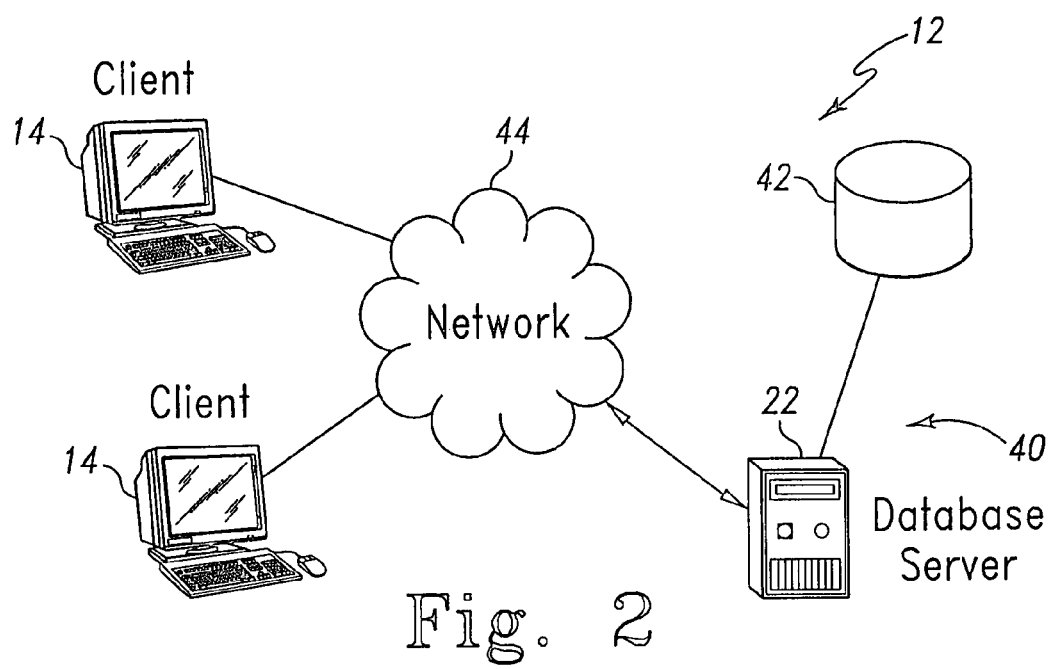
FIG. 2 is an illustrative example embodiment of a centralized data distribution system that forms a portion of one embodiment of the presently preferred netcentric computing system illustrated in FIG. 1.

FIG. 2 illustrates the most basic form of a centralized data storage system 40 that forms part of a netcentric computing system 12. The centralized data storage system 40 includes a data store 42 that is centrally located on a single machine that is the database server 22. All data required by one or more applications is kept in a single database therein. The single data store 42 includes a data storage device that is operable to store all the data for use in the netcentric computing system 12. The database in the data store 42 is accessed directly by the database server 22 using, for example, a single database manager instance (not shown). The database manager instance may be, for example, a database management system (DBMS), or other similar application that is operable to organize and coordinate the storage and retrieval of data from the database. The data store 42 is a single physical location for all the data that is shared by one or more of the clients 14. The clients 14 access the data store 42 by communication with the database server 22 via a network 44. The network 44 may be the LAN connection 30, the Intranet connection 36, the Internet connection 38, or some combination thereof, (all illustrated in FIG. 1) depending on the physical location of the client 14 with respect to the database server 22. Although not illustrated, those skilled in the art would recognize that data supplied by the database server 22 to the clients 14 may be supplied using the web servers 28 (FIG. 1) and may be based on data requests that originate from applications being used by the clients 14.

Other data storage systems used by the netcentric computing system 12 may be some form of a distributed data storage system. In distributed data storage systems, a plurality of the database servers 22 are utilized. The database servers 22 may be physically located together or in different physical locations within the netcentric computing system 12. Each of the database servers 22 may exclusively access a data store 42 or, two or more of the database servers 22 may share a data store 42. Access to the data within the distributed data storage system by the clients 14 is via the network 44 similar to the centralized data storage system 40 previously discussed. Similar to the centralized data storage system 40, those skilled in the art would recognize that data supplied by the database servers 22 to the clients 14 may be supplied using the web servers 28 (FIG. 1) and may be based on data requests from the applications being used by the clients 14.

Figure 3:
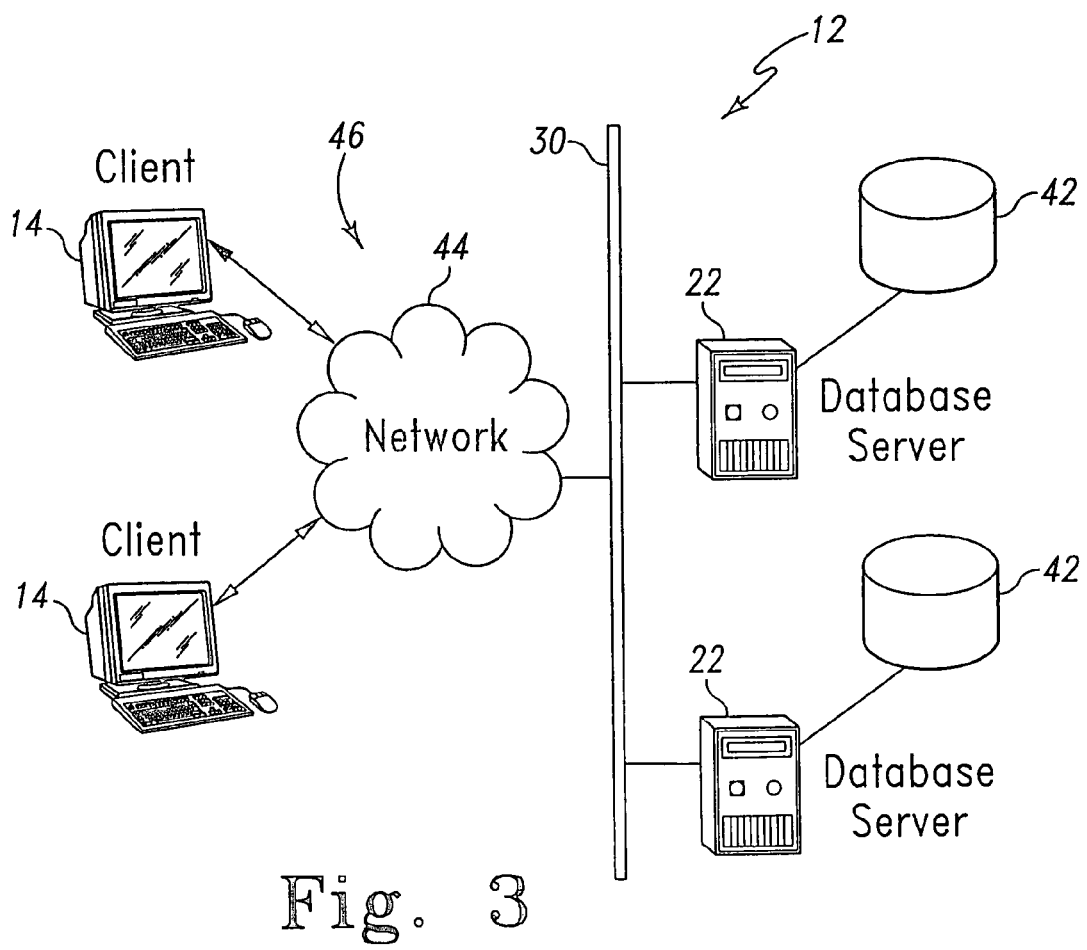
FIG. 3 is an illustrative example embodiment of a distributed by instance data storage system that forms a portion of one embodiment of the presently preferred netcentric computing system illustrated in FIG. 1.

FIG. 3 illustrates an example embodiment of one form of distributed data storage system that is part of a netcentric computing system 12 that is referred to as a distributed by instance data storage system 46. The presently preferred distributed by instance data storage system 46 includes at least one of the clients 14, a plurality of the database servers 22 and a plurality of the data stores 42. The data stores 42 include data storage devices that contain the data required by the applications within the netcentric computing system 12. In the example embodiment, supply of the data within the database servers 22 to the netcentric computing system 12 is over the LAN connection 30 and the network 44. The distributed by instance data storage system 46 is characterized by multiple data stores 42 that are accessed through more than one data management instance. The distributed by instance data storage system 46 may be implemented where the volume of the data within the netcentric computing system 12 is too large for the previously discussed centralized data storage system 40 to manage. In this situation, it may become necessary to split the database between two or more of the database servers 22 to create the distributed by instance data storage system 46.

Within the distributed by instance data storage system 46, the database is managed by multiple database manager instances and the data is distributed among multiple database servers 22. The presently preferred distributed by instance data storage system 46 is characterized by a single physical location, such as, for example, where the database servers 22 are located in the same room or building. In the example embodiment illustrated in FIG. 3, each of the data stores 42 is associated with an exclusive database server 22. In an alternative embodiment, the data contained in one of the data stores 42 is shared such that a particular data store 42 may be accessed by more than one of the database servers 22. The database servers 22 may be interconnected by the LAN connection 30 to provide the data to the netcentric computing system 12 and the clients 14 using the network 44. The distribution of data across multiple data servers 22 requires a segmentation strategy, as will be hereinafter discussed, to determine what data should reside together and what data can be located separately.

Figure 4:
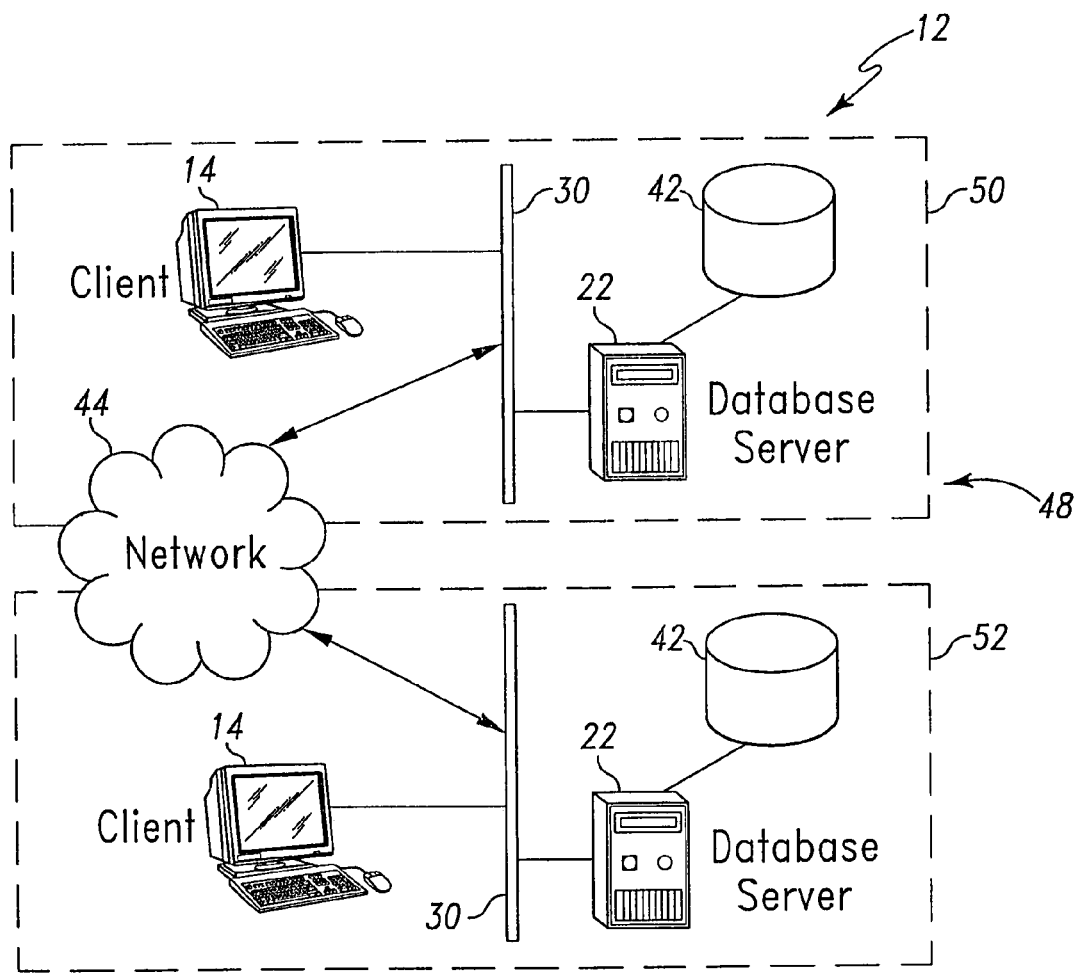
FIG. 4 is an illustrative example embodiment of a distributed by location data storage system that forms a portion of one embodiment of the presently preferred netcentric computing system illustrated in FIG. 1.

FIG. 4 illustrates another form of distributed data storage system that is referred to as a distributed by location data storage system 48. The presently preferred distributed by location data storage system 48 includes a plurality of clients 14, a plurality of database servers 22 and a plurality of data stores 42. In the distributed by location data storage system 48, data is accessed from more than one geographic location. The data is subdivided into a plurality of databases that are stored in the data stores 42 at the multiple geographic locations. The distributed by location data storage system 48 is characterized by multiple data manager instances and multiple database servers 22 accessing the databases directly. In addition, many of the clients 14 share one or more data stores 42. In general, the distributed by location data storage system 48 includes a data store 42 at each of a number of physical locations that store data for the clients 14 associated with the respective physical location.

As illustrated in FIG. 4, the presently preferred distributed by location data storage system 48 includes at least two different geographic locations, such as, a first location 50 and a second location 52. Communication at a respective location 50, 52 in the presently preferred embodiment may be by the LAN connection 30. In alternative exemplary embodiments, the clients 14 may be associated with one of the locations 50,52 but communicate with the LAN connection 30 using a dial-up modem (not shown), the Intranet connection 36 or the Internet connection 38. Communication between the first and second locations 50 and 52 is by the network 44 that was previously set forth to include the LAN connection 30, the Intranet connection 36, the Internet connection 38 or some combination thereof (previously discussed with reference to FIG. 1). Each location 50, 52 includes at least one of the data stores 42. By locating the data stores 42 near the location of the clients 14, improved speed of data access and local autonomy of the location 50, 52 may be achieved. In addition, potential bottlenecks of data traffic within the network 44 of the netcentric computing system 12 may also be avoided and protection from network downtime may be improved.

Another form of distributed data storage system is created by the clients 14 that are mobile. The clients 14 that are mobile typically do not maintain a continuos connection to the netcentric computing system 12. Instead, access to the netcentric computing system 12 may be by, for example, a dial up modem connection or the Internet connection 38. Accordingly, the clients 14 that are mobile require some portion, or all, of the data to be portable. The characteristics of the centralized data storage system 40 (previously discussed with reference to FIG. 3) are required for this to occur. However, the clients 14 that are mobile actually represent a form of distributed data system since each of the clients 14 that are mobile may possess a copy of some or all of the data in the netcentric computing system 12.

Distributing data in the netcentric computing system 12 requires some form of distribution strategy to allow efficient and cost effective operation. The distribution strategies of the presently preferred embodiments may generally be described as a segmented data distribution system and a replicated data distribution system. Segmentation and replication strategies may be used individually or together to fulfill the business requirements. In general, data replication produces data that is replicated from data stored in a central database. Conversely, data segmentation produces data that is partitioned into segments that together represent the total data present in the netcentric computing system 12. The combined use of data replication and data segmentation produces selectively distributed data. Selectively distributed data is a predetermined portion of the data that is produced by segmenting the central database and then replicating the segmented portion of the central database for storage in one or more locations.

In the presently preferred embodiment, segmentation is the process of dividing the data for the netcentric computing system 12 into multiple pieces, or segments, that may be referred to as partitioning or fragmentation. Segmentation can be done either by row or by column/table. In some cases, segmentation may be accomplished by both row and column/table. The presently preferred segmentation styles are referred to as horizontal segmentation and vertical segmentation. In horizontal segmentation, some rows of a table or database are physically stored in one data store 42, while other rows are physically stored in a different data store 42 within the netcentric computing system 12. Similarly, in vertical segmentation, some portion of the columns of data in a table or database are physically stored in one data store 42, while other columns of data in the same table or database are physically stored at another data store 42. In the presently preferred embodiment, the database segmentation referred to is for a relational database management system (DBMS), although the techniques can be applied to other types of DBMS.

One driver towards segmenting is the capacity of the database server 22. Typically, either the database server 22 does not have the capability to handle the amount of data involved, or the database server 22 cannot handle the transaction volume against the data. In addition, there may be distribution factors driving the decision to segment the database. If data is being distributed to multiple sites, every site may not need every piece of data since different clients 14 or groups of clients 14 need different information from the data. For example, in the case of a parts database for a device manufacturing enterprise, the accounting department probably does not care about the specification for a part, and the mechanic does not care who delivered the part, but the warehouse may need both pieces of information. Within the distribution side of segmentation, it is often less complex to only send the portion of the database that is needed by the clients 14 at a remote site, to save bandwidth usage within the network 44.

A segmentation strategy is typically considered both at the enterprise level for the different sites, or database servers 22, as well as the logical level for various tables or sets of data. One consideration is the physical need to segment. If the data storage option selected includes distribution by instance, as previously discussed, then some form of segmentation will be required. If data is to be distributed by location, segmentation and/or replication of data may be required to ensure that all the clients 14 have the information they need. Another consideration is the evaluation of a data entity grouping. The data entity grouping requires identification of a plurality of data entity groups. Each data entity group comprises a plurality of the clients 14 with similar data access needs. Before pursuing a segmentation strategy, it is important to understand the data entity groups concerned and the interactions between the various clients 14 in these groups. The initial design step involves identifying a predetermined number of data entity groups on which the capability relies, and then investigate their relationships with each other and with other clients 14. In the presently preferred embodiment, five data entity groups is a good initial amount to avoid over analysis, however, the amount could be higher or lower depending on the size and complexity of the netcentric computing system 12.

One preferred embodiment of the segmentation strategy is a horizontal segmented data distribution system. When data storage is distributed by instance, there is an opportunity for horizontal segmentation of the data across multiple, collocated database servers 22. Since the data is centrally located, the driver is the power of the database server 22, as previously discussed, to handle the management of the data in the netcentric computing system 12. If there is no plan for distributing by location, then the choice of segmentation keys, as will be hereinafter discussed, can be made according to any reasonable grouping that is available for the degree of partitioning required.

For data distribution that is the result of network limitations or desired autonomy, the data may be distributed by location, as previously discussed. Consequently, the segmentation strategy should reflect whom the major ("power") data entity groups for the data are. The data analysis for each data entity group may then determine whether all the clients 14 need equal access to all the data, or whether access to the data can be restricted at some predetermined level to a limited set of data entity groups. Those segments of data accessed by the limited set of data entity groups may be located at sites closer to these clients 14.

Another preferred embodiment of the segmentation strategy is a vertical segmented data distribution system. Vertical segmentation generally implies looking for data entity groups that have similar access patterns or share closely linked references. An example would be a plurality of subject-based data entity groups where all the clients 14 in a first data entity group are related primarily, for example, to ordering functionality. In this example, the corresponding data for the first data entity group may be resident on one database server 22, while the remaining data entity groups concerned with, for example, customer characteristics may be candidates for a different database server 22. Those skilled in the art would recognize that the use of call pattern analyses and transaction volumes would aid in this determination.

Data segmentation is an iterative rather than a one-time process. Appropriate care should be taken to try various scenarios on the proposed segmented data to ensure that the performance will not be unduly affected by massive queries that try to access multiple segments of the data. In another preferred embodiment, the segmentation strategy can be supplemented with a replication strategy, although, in general, segmentation is easier than replication, but may provide a lower level of performance. In general, the segmentation strategy is very dependent upon the particular types of access to the data that are required.

Horizontal segmentation may be used in situations where access to every record in a table is not required. It is often the case that local/regional clients 14 will only be required to work on data pertaining to their geographic locality. Additionally, when data is distributed by instance, one common choice for deciding on how to split up the data is based on the horizontal segmentation strategy. An example might be a large corporation who wishes to keep personnel data in one central data store, but is forced to segment due to the size of the database involved. The split might be keyed on, for example, the personnel number, office location, alphabetic last name or division depending upon the breakdown of people for that company.

Figure 5:
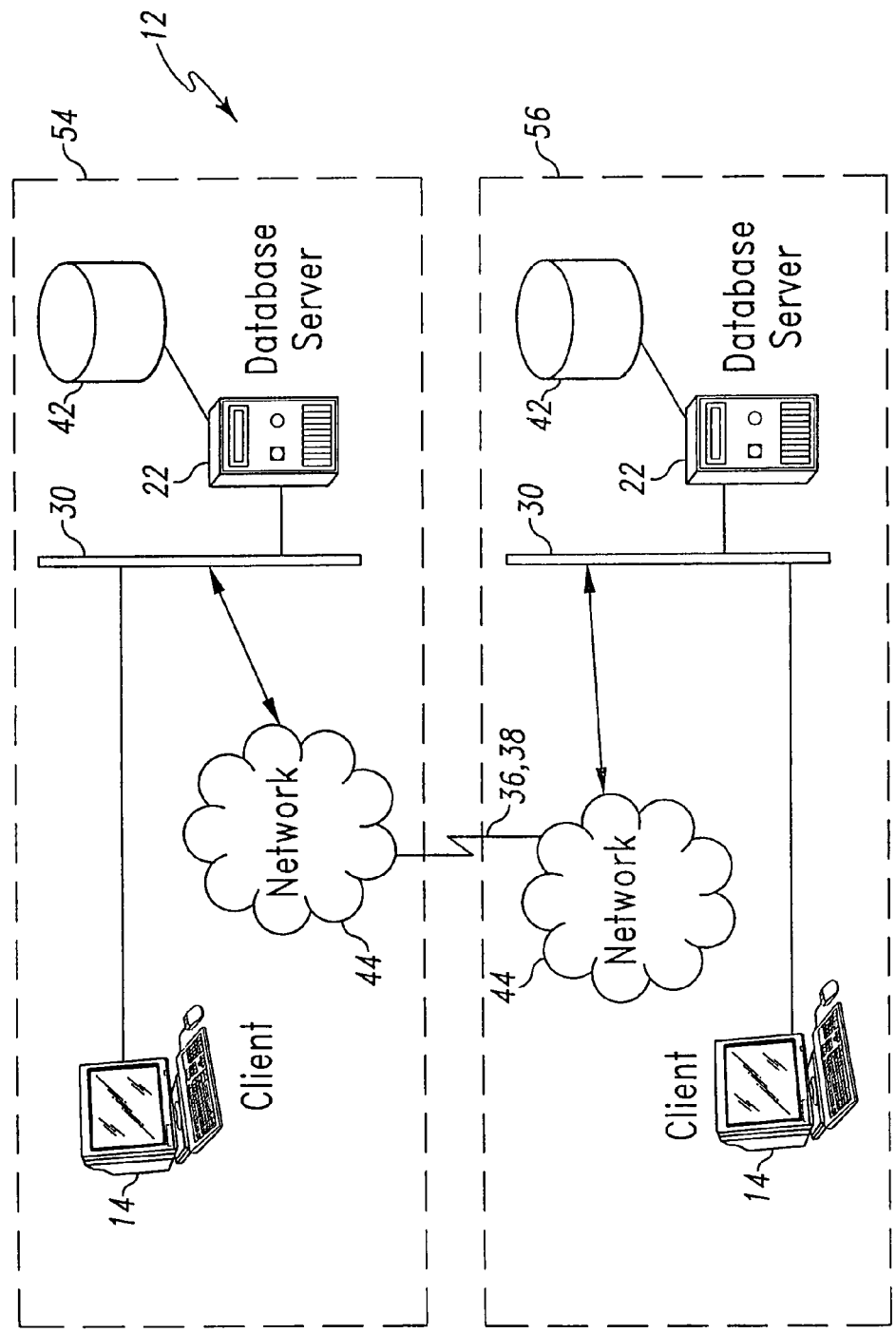
FIG. 5 is an illustrative example embodiment of a location distributed, horizontally segmented data distribution system that forms a portion of one embodiment of the presently preferred netcentric computing system illustrated in FIG. 1.

FIG. 5 illustrates a location-distributed example of the presently preferred horizontal data segmentation strategy. The location-distributed example is a global company that has offices in a first city 54 and a second city 56 that are operating within a single netcentric computing system 12. Each of the offices constitutes a data site that includes at least one client 14, at least one database server 22 and at least one data store 42. The clients 14 that are considered local with respect to an office, may access the data at that office with the LAN connection 30, the network connection 44, or a dial-up modem connection (not illustrated). Communication between the first city 54 and the second city 56 may occur using, for example, the Intranet connection 36 or the Internet connection 38.

In this example embodiment, local clients 14 perform the human resources function at each office. If the office in the first city 54 does not have a great need to access the data of the office in the second city 56, it makes sense for the office in the second city 56 to keep its data in the second city 56 and the office in the first city 54 to keep its data in the first city 54. In the example embodiment, at each office (data site), the clients 14 may see the employee data for that office as if it were the entire data for the company.

When analyzing horizontal segmentation as a partitioning strategy, it should be determined whether or not the majority of the data access will be coming from the same location as the data. In general, it is advantageous to ensure that at least 80% of the data access volume is being generated at the local data site. Otherwise, it is probably better to position the data at a more central location. Those skilled in the art would recognize that one drawback of performing segmentation of data in a horizontal manner is the difficulty of performing simple cross-segment activities, since the data is located in several different databases. As long as access to the segment of the data that is local is only required by the clients 14 that are considered local, this potential problem remains hidden.

However, once one of the clients 14 tries to implement an activity on the distributed segments of the data as a whole, the application performance may decrease sharply, possibly affecting all the clients 14 while the activity completes. The decrease in performance may occur since the segments of the data from the "remote" data sites would need to be reconstructed at the local site before the query could be performed.

Horizontal segmentation in the preferred embodiment includes rows grouped according to a master identifier referred to as a segmentation key. The segmentation key is a defining key that allows the records in the database to be identified uniquely across the entire data store 42. In addition, the records may be located and grouped together according to the characteristics of part of the segmentation keys. Examples of horizontal segmentation schemes could be by first letter of last name, by telephone number area code, by employee office code, by birth year, by account branch code, by account manager (mobile sales force data), by site (inventory for one location only, etc.), or by some other similar group-based criteria.

Performing segmentation in a horizontal manner effectively requires that all the subordinate tables for the segmentation key and all frequently accessed reference data be located at the same site. For example, it is not always a good idea to locate employee personnel data at the local site but keep department information elsewhere, unless the employee/department relationship in the data is rarely used. Choosing the correct segmentation key is crucial to the success of the segmentation. The decision should reflect the ownership of the data and appropriate identifiers may be chosen based on guidelines.

In the presently preferred embodiment, one guideline is that the identifier should be fairly static. For example, an identifier such as a last name may appear to be a relatively static candidate, but might still be unsuitable if the mechanism for handling such life events as marriage and divorce is not in place. Another guideline may be that the identifier should be meaningful to the location of the data. For example, U.S. Social Security numbers are issued based in part on the location issuing the number. Using a social security number as a segmentation key for location-based information, however, may not be a useful choice, since the SSN digits denote the place of issue, and not the current place of residence/business. Thus, although the segments will be sized according to birth location, the data relevant to that location might end up being stored on a different database server 22.

An additional guideline may be that the identifier should be unique at all sites. For example, a U.S. 10 digit phone number does not present uniqueness for international segmentation, as there could be duplication of the identifier at several sites in Asia, Europe or other continents that use a local 10 digit phone numbering system. A further guideline for the distributed by instance data storage system 46, is that the segmentation key should provide the best data spread in terms of physical placement and volume of transactions. Similarly, a guideline for the distribution by location data storage system 48 is that the segmentation key should match the enterprise's data distribution approach. Those skilled in the art would recognize that the previously discussed guidelines are not a complete listing and additional guidelines that are similar to the rules of database design combined with the needs of the distributed data design may warrant consideration.

When performed correctly, horizontal segmentation will reflect a natural way to partition data that is in line with the way the applications of the enterprise structure their transactions. If all the segmentation keys are unique, this form of data segmentation is also able to support the use of referential integrity, since all of the records for the segmentation key will be located at one data site. Finally, the segmentation architecture may be configured with scalability in mind to meet future needs as the netcentric computing system 12 grows.

Another preferred embodiment of the segmentation strategy is a vertical segmentation strategy. One form of vertical segmentation strategy is storing related subject matter areas on different database servers 22. These segments are often viewed as "subject databases," since they are located together based on the type of data contained therein, not a segmentation key or similar master identifier. Examples of subject databases (vertical segmentation) might be, for example, product order data separate from customer and product data, corporate financial accounts separate from customer financial accounts, or user access maintained separately from user information for security reasons. In addition, specialty data type content maintained separately from the description/index may form the subject database, such as, for example, digital asset information (images, sounds, etc.) kept separately from their catalog descriptions.

Vertical segmentation designed to correspond to various, related subject matter in the data may allow the relatively straightforward addition of new subject databases since only an additional segment is required. Application of vertical segmentation is most advantageous in transactions that are interested in a limited amount of detail on all records. On the other hand, those transactions that are concerned with all information about a record may have to access more than one data store, making vertical segmentation a less desirable solution.

Implementation of a vertically segmented data store may lead to a more complex strategy for maintaining referential integrity since the data for a single record is now distributed around the netcentric computing system 12. In general, vertical segmentation is advantageously used in breaking up a large database into smaller subject areas; whereas horizontal segmentation is a superior solution when the data access model is consistent for the various applications and locations, but the data content varies.

In the presently preferred embodiment, vertical segmentation may be advantageously used for data, which is read only, or relatively static data, as well as data that is not as frequently accessed along with other related data. For example, in the data of a financial institution operating a netcentric computing system 12, not every transaction needs to access a photo of the account holder. Vertically segmented data is also useful where the applications within the netcentric computing system 12 do not frequently cross segment boundaries. For example, referring again to the financial institution example, one application may serve the checking account data while another application deals with CD account transaction data. Other situations where vertical segmentation may be considered include those where security is a high priority issue, where semi-related data is used in very different ways, or when related data has different storage/retrieval mechanisms.

In another preferred embodiment, the data within the netcentric computing system 12 may be segmented, both horizontally and vertically. Those skilled in the art would recognize that this scenario would produce all of the limitations but not all the strengths associated with horizontal or vertical segmentation alone if the same database or table is involved in both types of segmentation. Such a data distribution system may have complex referential integrity and may offer poor performance with either record intensive or entity intensive queries. However, if the data subjected to horizontal and vertical segmenting in the netcentric computing system 12 is mostly read only, then this scheme may prove valuable.

Other considerations when implementing the segmentation strategy of the presently preferred embodiment include segment size, scalability of data size, scalability of transaction volume and consideration of cross-segment intensive transaction handling. When considering segment size, it is important to determine the number and size of segments in the netcentric computing system 12 for capacity planning, performance testing and other design considerations. The scalability of data size involves analyzing the work involved in resizing the segments to create a different grouping. For example, if segmentation is performed on the basis of last names, and data space on one database server 22 is not sufficient to handle all the Smiths, then it will become necessary to investigate segmenting at an even lower level than last name.

The scalability of transaction volume pertains to information on the transaction volume expected within the netcentric computing system 12. The transaction volume and the growth projections for horizontally segmented data may need to be analyzed and validated before continuing the segmentation strategy design. The analysis and validation may be performed to identify segments having an unnaturally large transaction volume. For netcentric computing systems 12 that utilize vertical segmentation, this is less of a concern, since additional data stores 42 could be added to support further vertical segmentation that forms additional portions of the data.

For horizontal segmentation, cross-segment intensive transactions are those transactions that attempt to access many records in a table, regardless of the number of data stores 42 into which the table has been segmented. Those skilled in the art would recognize that some candidates for creating such transactions are batch processes or global updates. For vertical segmentation strategies, the cross-segment intensive transactions are those that need access to all information about a record, wherever it is stored.

Figure 6:
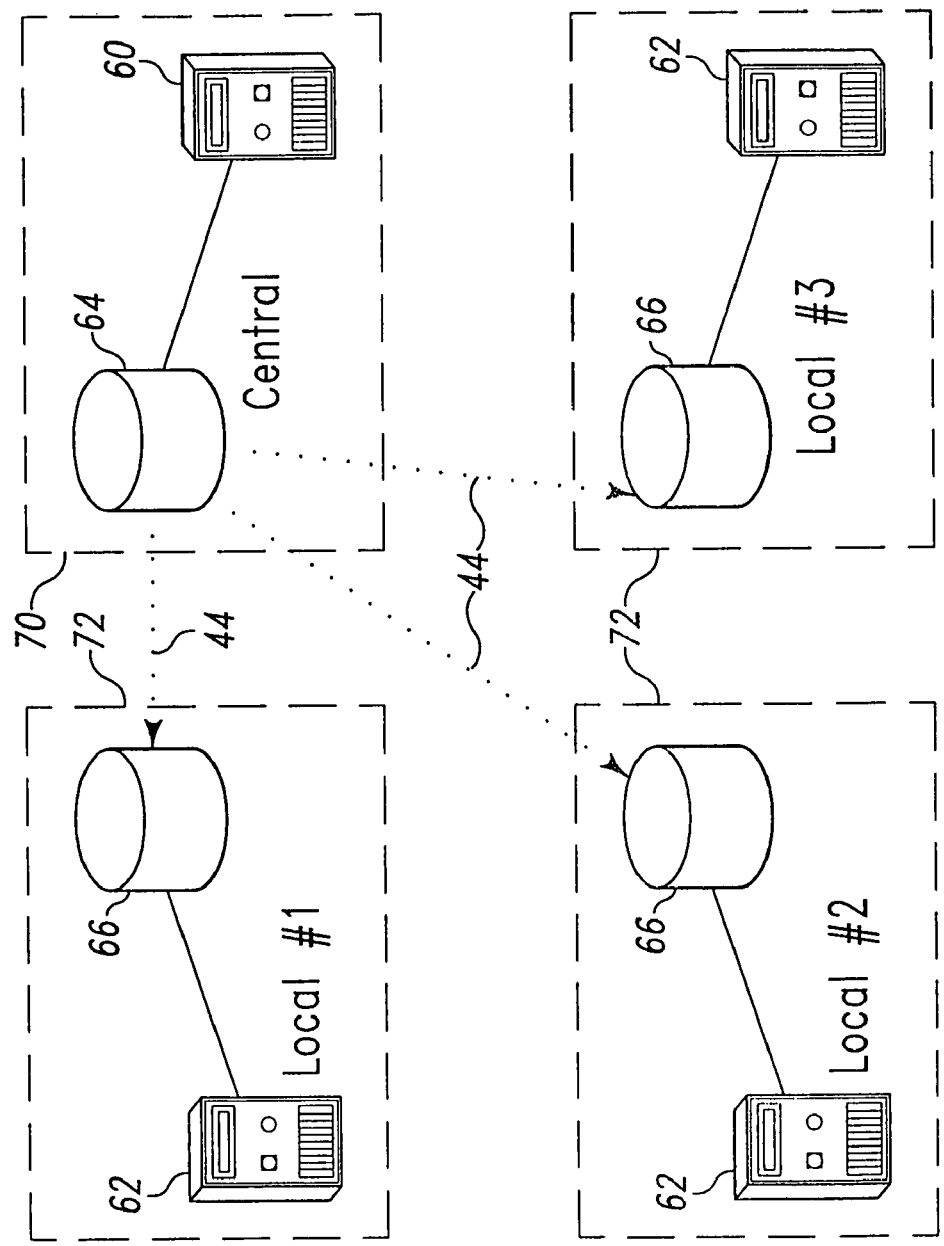
FIG. 6 is an illustrative example embodiment of a replication data distribution system that forms a portion of one embodiment of the presently preferred netcentric computing system illustrated in FIG. 1.

FIG. 6 illustrates the other distribution strategy of the presently preferred netcentric computing system 12, which is the replication data distribution system. The presently preferred data replication strategy includes at least one central database server 60 and at least one local database server 62 that communicates over the network 44. The central database server 60 is operable to access data in at least one central data store 64 that contains the data in at least one central database. Similarly, each of the local database servers 62 is operable to access data in a corresponding local data store 66 that contains replica data in a local database. The data stores 64, 66 include at least one data storage device. The location of the central database server 60 and central data store 64 are preferably located at a central site 70. The local database servers 62 and the local data stores 66 are located at a plurality of local sites 72 that may be remote from the central site 70. The local sites 72 may be strategically located to allow access to the replica data by the clients (not shown) that are associated with one of the corresponding local sites 72 within the netcentric computing system 12.

The presently preferred data replication strategy avoids the limitation associated with segmentation strategies by creating synchronized, working copies of the data. This technique is called replication. The working copies of the data are created from the central database and stored in the local databases as the replica data. Replication allows multiple copies of predetermined portions of the data to be stored at different local sites 72 and, depending upon the chosen strategy, can provide local retrieval or update capabilities. The presently preferred replication strategy advantageously provides increased performance at the local sites 72 while improving reliability and cost effectiveness within the netcentric computing system 12.

Those skilled in the art would understand that the previously discussed segmentation strategies may be used in the replication strategies.

Performance is enhanced since the replica data allows faster data access by the clients 14 relative to remote network access. Thus, it is not uncommon for data that is used often, yet changes rarely, to be replicated down to the level of the local sites 72. In addition, data replication is desirable for clients 14 that are mobile since data may be replicated to their mobile systems. The mobile client 14 will attach to the netcentric computing system 12 and either manually, or automatically, up- and down-load the changed data. Upon disconnecting, the mobile client 14 may retain enough of the replica data available to perform their daily workload.

Replication also contributes a reliability component by providing local autonomy. With a local replica of a portion of the data, it is possible for the application to continue to support the clients 14 at the local site 72, even if some or all of the non-local data is not accessible. Thus, replication may be a strong component for many failover or high availability environments. However, the downside is that system integrity is deferred until the replication jobs can be run to synchronize the central database and the local databases.

The cost of improving a network 44 to get high-speed access may be significantly greater than adding the capability to replicate the data and a replication strategy to keep the replicated data current. If the data replication is not required on an urgent basis, then the replication can take place outside of the normal business hours, allowing the clients 14 to get the benefits of both local data performance and autonomy and still have accurate data to work with. The cost of performing the synchronization outside hours, is that there will be significant system latency, as will be hereinafter discussed.

Replication is operable to synchronize multiple data stores 42. Accordingly, the replication strategy requires that the consequences of lost communications between portions of the netcentric computing system 12 be accounted for in the design decisions. In addition, maintenance of the netcentric computing system 12 may also be complicated, requiring a deeper skill set from the operations staff maintaining the netcentric computing system 12. If some form of bi-directional (peer-to-peer) replication is used, there may also be a chance that the replicas will get out of synchronization. Loss of synchronization may produce contradictory data within the netcentric computing system 12.

In general, the choice of update strategies within the presently preferred replication strategies is between unidirectional updates and bi-directional updates. Unidirectional updates are sent only from the central database server 60 to the local database servers 62. Conversely, bi-directional updates also include updates sent from the local database servers 62 to the central database server 60. Bi-directional updates using a single central database that owns the data that is replicated in the local databases is one preferred embodiment. A bi-directional replication scheme with multiple central databases that are owners of data replicated in the local databases is an alternative embodiment.

In addition, different embodiments of the replication data distribution system may include features such as latency, write-ability of replicas, initiation of synchronization, full or partial updates, and replication trigger mechanisms. Latency is the amount of time that replica data is allowed to be out of synchronization with the central database. Write-ability of replicas is the ability to write to a local database as opposed to just read-only access. Initiation of synchronization involves the choice of an update initiator. For example, the central database server 60 may push data to the local database servers 62 vs. local database servers 62 requesting updates from the central database server 60. Full or partial updates involve replication of all data to every local database server 62 vs. limiting replication selectively to data known to be required locally, i.e., just the data that has changed. Replication trigger mechanisms provide replication between data stores 64, 66 that may be initiated by several means such as, for example, batch jobs, periodic updates, just-in-time updates or manual updates.

The presently preferred unidirectional replication system involves communication between at least one central database server 60 and at least one local database server 62 using the network 44. The central and local database servers 60, 62 can be located anywhere in the netcentric computing system 12. The central database server 60 and local database server 62 may be in communication with one or more central data stores 64 and local data stores 66, respectively.

Unidirectional replication is limited to replication in a single direction. This means that the "local" replica data is effectively read-only data and any updates to the replica data are transmitted to the central database. This form of replication may be used for data that requires significantly less update access than read access and is particularly useful for relatively static data or providing a "warm standby" data store for disaster recovery. Example embodiments of unidirectional replication include client-initiated extraction, data snapshot and publication. Client initiated extraction is characterized by the local database server 62 taking responsibility for requesting and/or extracting updated data that has been replicated from the central database server 60. This may be described as pull technology and may be used for read-only data. The strategy relies on human intervention and so may not be suitable for mission critical systems, large user groups or large data sets. Data snapshot involves creating the replica data and "freezing" the corresponding data in the central database. The replica data may be sent to the local database servers 62 at a pre-arranged time, and be stored in the local database. Generally there may be a batch process involved and, between the transmission of each snapshot, there is the probability that the replica data will be left in a state of incoherence. Two variants of this example embodiment allow update of either the complete contents of the local database in the local data stores 64, or differential update of all the changes from the last known update. Those skilled in the art would recognize that the differential update provides savings in bandwidth and processing power.

The publication example of the unidirectional replication embodiment allows the central database server 60 to broadcast updates to the local database servers 62. The updates that are broadcast may be in the form of replica data generated from the central database. This embodiment may operate by storing transaction updates to the data in the master database until a pre-determined threshold is reached. At this point, the updates are published for the local database servers 62 to store in the local databases. The local database servers 62 in turn, subscribe to the publication and monitor for relevant broadcasts. This technique may be useful when selective replication is being performed, since a particular local database server 62 may only wish to know about some of the updates. This technique may also be used for bi-directional replication.

As known in the art, with any periodic update mechanism, the lower the setting of the update period threshold, the smaller the latency (out of synchronization period) becomes. One example embodiment would be a threshold of a single transaction. This is the algorithm that may be used to provide a "real-time" update capability, with the transaction being updated on the local database server 62 as soon as it clears the central database server 60. The disadvantage of this update method comes in the amount of network and CPU resources required to support the updates, and the fact that the replication effectively requires the implementation of a synchronous or transactional update system. Under certain circumstances, the publication and subscription embodiment may be extended into a hierarchical topology by designating a subscriber to perform the role of publisher for a lower tier of the local database servers 62.

The presently preferred bi-directional replication is similarly performed by at least one central database server 60 and at least one local database server 62 and corresponding data stores 64, 66. In one embodiment, the ability to update at more than one local site 72 is performed by a dedicated data manager instance capable of performing bi-directional replication. Bi-directional replication may be used in strategies known as peer-to-peer, fast or symmetric replication. During operation, when a change is made on any of the local data stores 66, the information is transmitted almost immediately to all the peers in the network. The system may be implemented using either a central mediator or directly between peer systems.

The bi-directional replication strategies advantageously improve local performance due to the local database servers 62 providing a fully functional replica of the data that can be accessed and updated locally. Those skilled in the art would recognize that the main cost of implementing this style of replication is the additional task of dealing with the inevitable replication conflicts that will come from simultaneous updates of the same records in the central database. This can be exacerbated by the network 44 being out of commission, since the updates will accrue without being propagated.

Accordingly, conflict resolution is a major consideration in the decision to use bi-directional replication. Those skilled in the art should be wary of choosing a bi-directional replication scheme without thoroughly investigating and addressing the issues that will come from that decision. The penalty for not addressing these issues can be very high, when crucial business decisions are made from inconsistent data. Another consideration involving implementation of bi-directional replication is the requirement for additional network and processor resources to handle both the normal updates and the conflict resolution; a cost that grows exponentially with the size of the netcentric computing system 12.

An alternative embodiment is selective replication, which provides selective or partial replication. Selective replication provides the ability to combine the tactics of segmentation and replication. In this embodiment, only a subset of data is replicated, and may include different subsets being chosen for each replica. An example scenario where the use of selective replication is applicable would be a mobile sales force automation application. Typically, such an application would only contain the data relevant to the sales calls for that day. This data could be distributed by horizontal segmentation. The sales manager may require specific data pertinent to executing a sale, but may not need other customer data, which is stored in the central database. Accordingly, this data could be distributed by vertical segmentation. Lastly, the sales force should have access only to copies of the data to mitigate the risks created by a catastrophic event, such as losing the only copy of data if a laptop is stolen. Therefore, replication of the data would provide access without the risk of catastrophic data loss.

The presently preferred replication strategy provides a plurality of exemplary replication scenarios. The replication scenarios include a single updateable central database scenario and a local update scenario. Those skilled in the art would recognize that other scenarios are possible and that the presently preferred replication strategy is not limited to the example scenarios provided.

In the presently preferred single update central database scenario, there is a single central copy of the database at the central site 70 with multiple replicas (local databases) distributed across the network to individual local sites 72. Since there is only a single central database, the update scheme may use unidirectional replication as previously discussed. The single central database may be updated by a central update approach, a remote log-on approach, a remote batch approach or a local checkout approach. In the presently preferred central update approach, any updates made to the single central database are made only at the central database server 60 at the central site 70 and then distributed out to the various local database servers at the local sites 72. This approach may generally be used for data that applies to the entire enterprise that, by its nature, is maintained by a single entity data group. One example would be the part numbers of all the products in an enterprise's product line.

Figure 7:
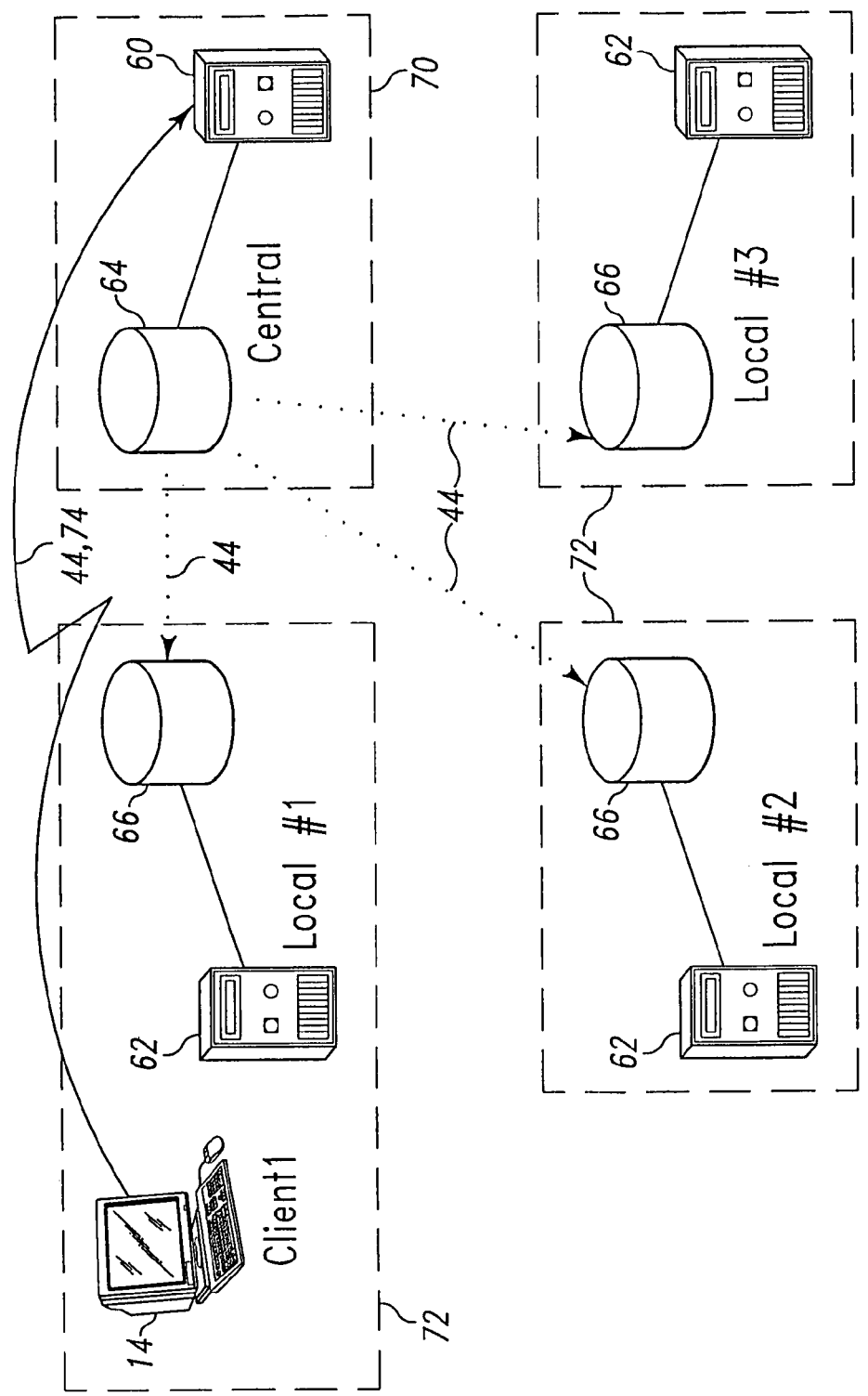
FIG. 7 is an illustrative example embodiment of a replication data distribution system that utilizes a remote login approach within one embodiment of the presently preferred netcentric computing system illustrated in FIG. 1

FIG. 7 illustrates an example of the presently preferred remote log-on approach. In this approach, the clients 14 use a plurality of local database servers 62 located at local sites 72 to make changes to that portion of the central database "owned" by their location via remote log-on to the central database server 60 at the central site 70. Communication between the local database servers 62 and the central database server 60 is by the network 44. The remote login communication between the clients 14 and the central database server 60 may be via the network 44, a dial-up modem 74 or other similar communication mechanism. In the example illustrated in FIG. 7, the client 14 at the local site 72 identified as "Local #1" is remotely logged in to the central database server 60 to update the central database with updated data from the local database. The data resides in the central data store 64 and the local data stores 66 that are associated with the central database server 60 and the local database servers 62, as illustrated.

Coordination of the updates of the data from the local database servers 62 that is sent via the clients 14 to the central database may be performed by the central database server 60. This approach may require security controls to regulate the access by the local sites 72 to the central site 70 and to the central database. The changes made by the local sites 72 are then reflected in the next distribution via the network 44 of replica data to the local databases using the selected replication mechanism. This approach allows local update of the central database, while still maintaining a single central database.

Figure 8:
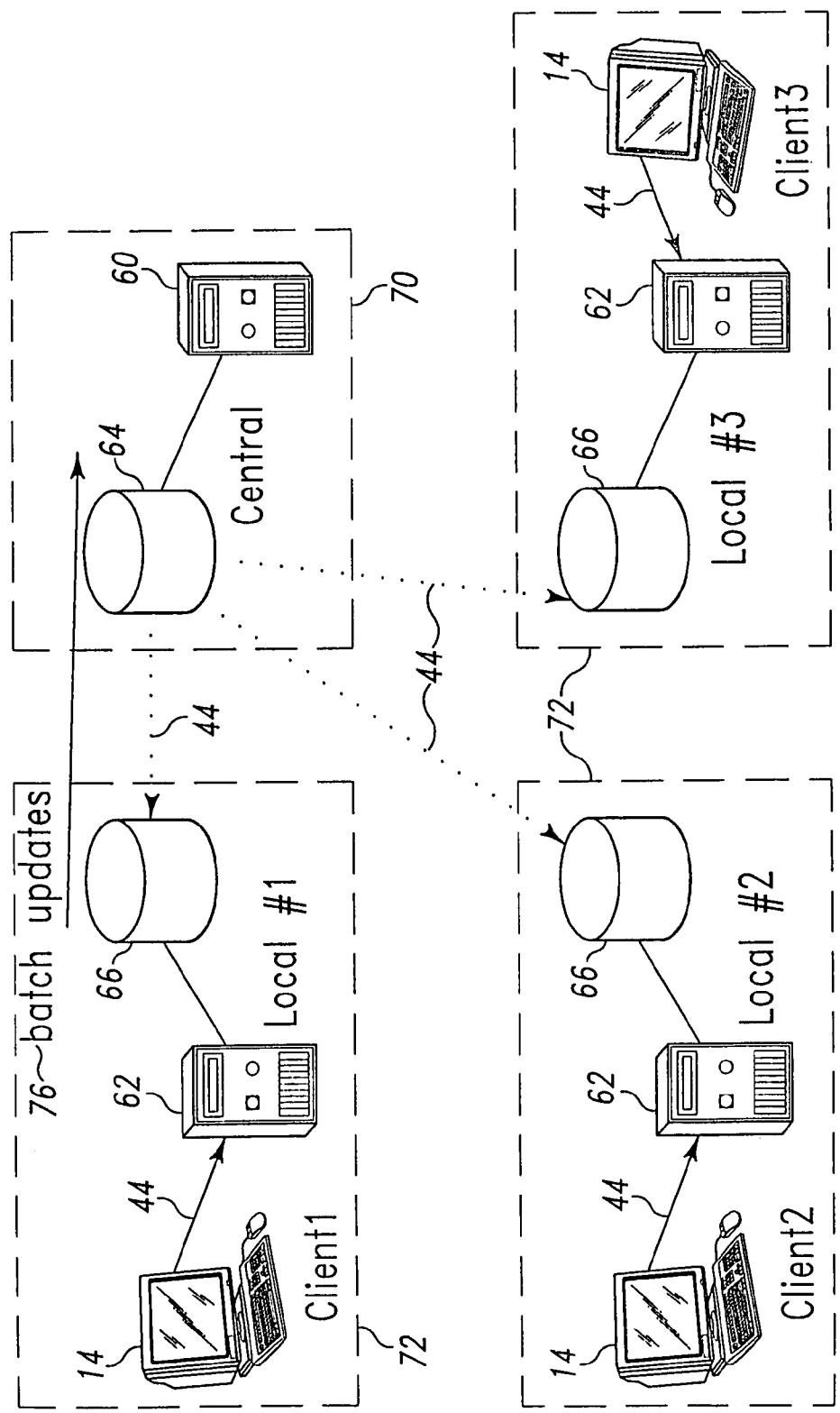
FIG. 8 is an illustrative example embodiment of a replication data distribution system that utilizes a remote batch approach within one embodiment of the presently preferred netcentric computing system illustrated in FIG. 1

FIG. 8 illustrates an example application of the remote batch approach to the netcentric computing system 12 that uses the single updateable central database approach. In the presently preferred remote batch approach the clients 14 at the local site 72 make changes that are batched locally, then sent via the network 44 to the central coordinating location that is the central site 70 for processing as a batch update 76. In the example illustrated in FIG. 8, the client 14 at the local site 72 identified as "Local #1" is sending a batch update 76 to the central site 70. Once again, the changes are reflected in the next update of the local data stores 66 on the local database servers 62 at the local site 72. This approach may also require adequate security controls to ensure that the local site 72 is updating only their own replica data. This is fundamentally the same approach as the remote log-on approach previously discussed, but allows the actual update processing at the central site 70 to be scheduled at convenient times. If this approach is extended to allow multiple local sites 72 the ability to update the same data, the central database server 60 must have processing in place to resolve update conflicts and notify the local sites 72 if their transaction has been rejected.

The local checkout approach of the presently preferred embodiment allows the local site 72 to dynamically acquire ownership of any central data from the central data store 64 and modify it. The replica data is transmitted from the central database server 60 (checked out) to the local database servers 62, updated, and then returned after the update. While the central data is checked out, other clients 14 are restricted to read-only use. Following receipt and incorporation of the update at the master database, replica data reflecting the update is generated and transferred to the local databases. This approach is most effective when many of the clients 14 require the ability to update the same data, but there is no clear owner of the data, and data integrity must be guaranteed. Implementation of this approach may require building a custom locking system of data that has been "checked-out." This strategy would require the replica data to be transferred upon request from the central site 70 to the local sites 72 that initiated the request.

The single updateable central database scenario maintains the most centralized control of the data and therefore is more suited for data that needs tighter security. This scenario is also the least complex to implement as illustrated by the previously discussed update approaches. In addition, data synchronization issues are relatively easy to identify and correct.

Another preferred embodiment involves a local update strategy. The presently preferred local update strategy includes a local update-single owner approach, a local update with coordinator approach, or a local update with multiple owners approach. In the presently preferred local update-single owner approach, updates are made locally by the one local site 72 that is the owner of the data. Each local database contains the replica data required for local operations and can update the replica data that is locally owned. This approach applies when the data is segmented, as previously discussed, and resides at only one local site 72 and the central site 70, or when data resides at more than one local site 72 and a control mechanism is in place to restrict update authorization to one of the local sites 72.

In this embodiment, there is only one owner for each data instance or row in the data of the netcentric computing system 12, but the changes are made locally, then either transferred to the central site 70 for distribution or distributed directly to the other local sites 72. In the presently preferred embodiment, the update scenarios that may be used to distribute the changes from the local database to the other local databases include a local update with coordinator site strategy and a local update with no mediator strategy. Those skilled in the art would recognize that other local update strategies are possible.

Figure 9:
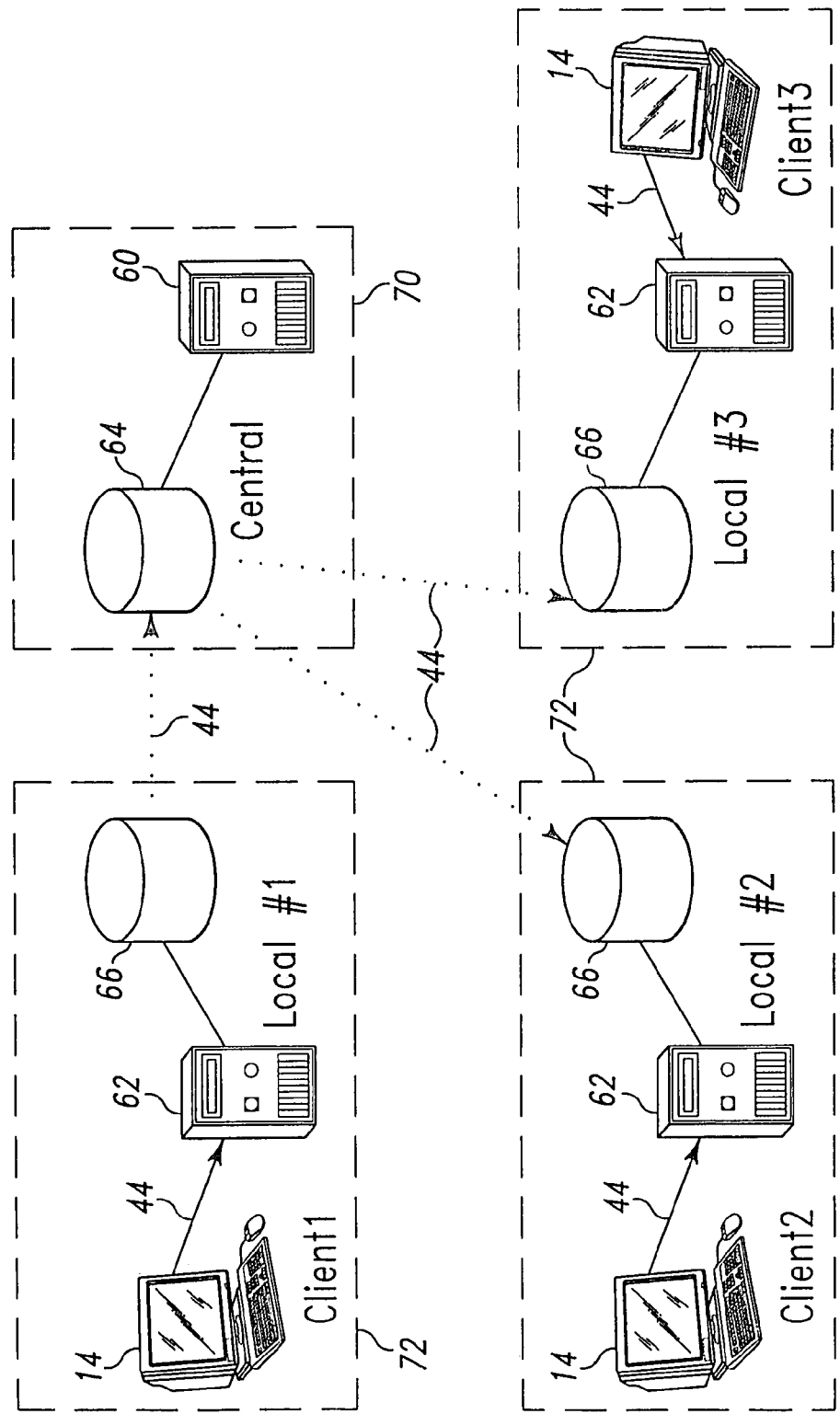
FIG. 9 is an illustrative example embodiment of a replication data distribution system that utilizes a local update with coordinator site strategy within one embodiment of the presently preferred netcentric computing system illustrated in FIG. 1

In the exemplary embodiment of the local update with coordinator site strategy, as illustrated in FIG. 9, one of the local database servers 62 ("Local #1" in FIG. 9) at a corresponding local site 72 transfers data changes to the central site 70 via the network 44. The data changes are then propagated to the other local sites 70 ("Local #2" and "Local #3" in FIG. 9) via the network 44 as illustrated. The central database server 60 coordinates and maintains the information needed to distribute the changes to the local database servers 62 at the other local sites 72. The clients 14 at the respective local site 72 where the data changes originate control the updates to the local data store 66 and the transfer of the data changes to the central data store 64 as well as the other local data stores 66. Since the distribution of data to other local sites 72 is performed by a single coordinating location, this is probably the easiest way to distribute changes to other local databases.

Figure 10:
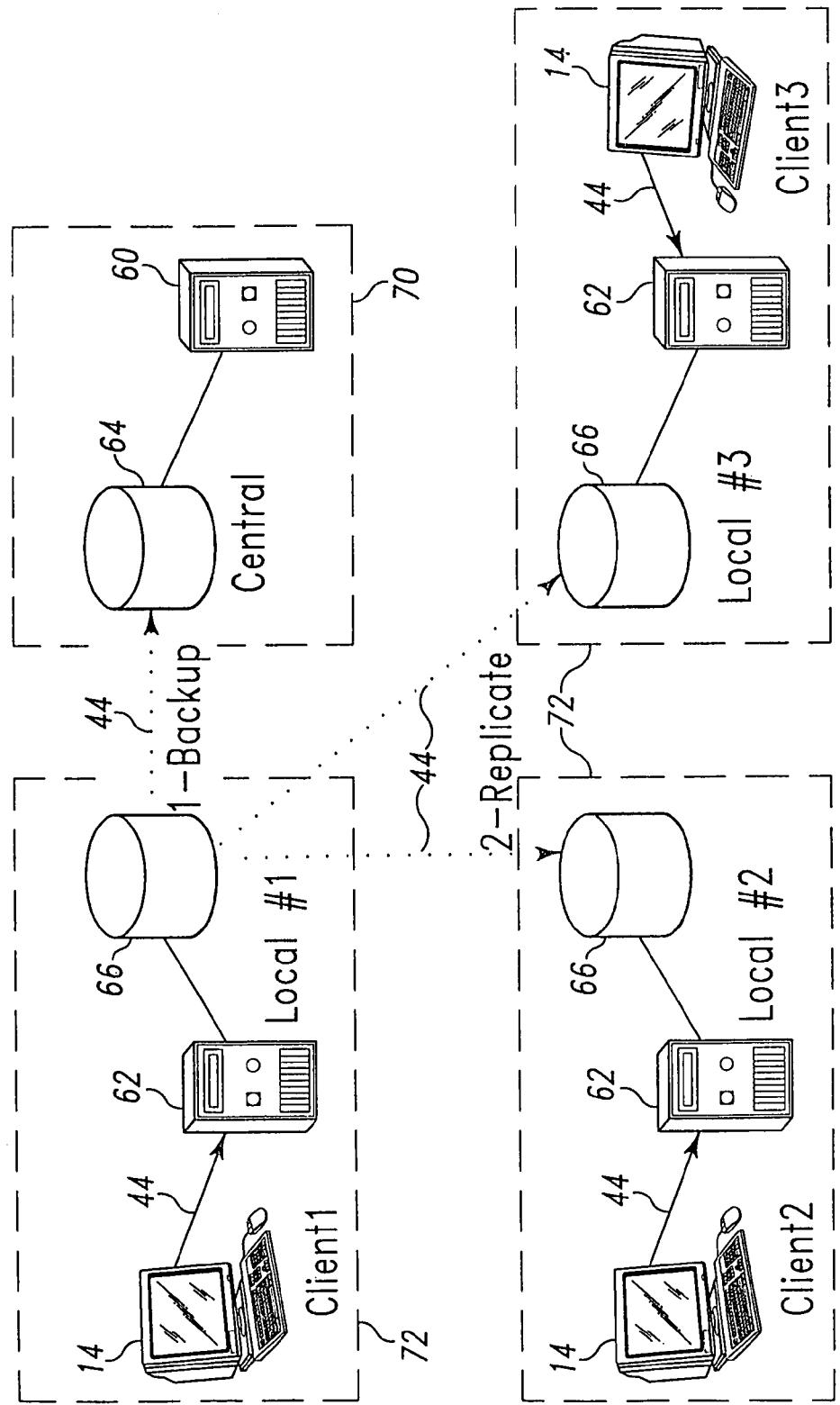
FIG. 10 is an illustrative example embodiment of a replication data distribution system that utilizes a local update with no mediator strategy within one embodiment of the presently preferred netcentric computing system illustrated in FIG. 1

The exemplary embodiment of the local update with no mediator strategy illustrated in FIG. 10 places the burden of distribution on the local database servers 62. The burden is on the local database servers 62 since each local site 72 distributes data changes by the clients 14 associated with that local site 72 to the other local sites 72 and the central site 70. Thus, each local site 72 must then be responsible for routing the replica data to the other local sites 72 via the network 44. In the example illustrated in FIG. 10, the local database server 62 at the local site 72 identified as "Local #1" distributes replica data that is changed to the other local sites 72 identified as "Local #2" and "Local #3," as well as distributing all the data changes to the central site 70.

The central data store 64 within the central database server 60 at the central site 70 may be used for several other functions. One function of the central database server 60 may be to maintain a back-up copy of the data contained in the netcentric computing system 12. This can be quite useful if replica data on the local data stores 66 at the local sites 72 becomes corrupted or lost. The central database within the central database server 60 may also serve as a source of data for management reports. If, for example, a management report needs to span multiple local sites 72, it may be easier to use the central site 70 as a single source for data than to go to each local site 72 one-by-one. Finally, the central database server 60 can fulfill a "hot back-up" function. Using this function, if communication on the network 44 is lost between the local sites 72, it may still be possible to get the information from the central database at the central site 70.

The local update-multiple owners scenario allows multiple local sites 72 the ability to update the same replica data. This scenario either removes the ownership from the data, or allows multiple owners of the same data. Because there may be multiple owners, this may need to be implemented using bi-directional replication, as previously discussed. Accordingly, this scenario may be very complex to implement as it allows multiple local sites 72 the authority to update the same row in the central database. With this scenario, update conflicts are inevitable. Because of these conflicts, a mechanism must be implemented to mediate between conflicting update requests and determining which update the master database should be performed, and should be rejected. In the presently preferred embodiment, implementation of the local update multiple users scenario includes a central site mediator and peer-to-peer database updates.

Figure 11:
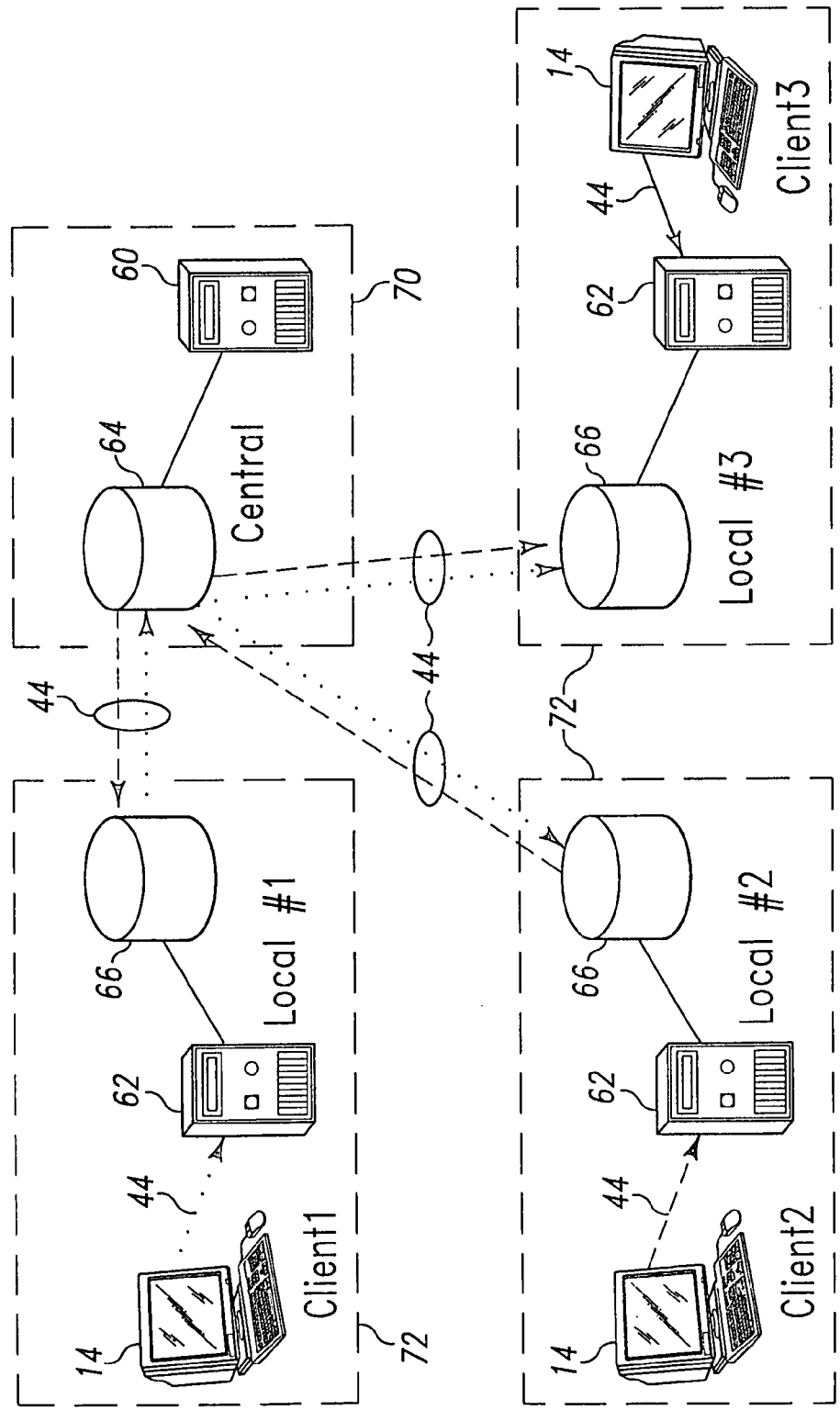
FIG. 11 is an illustrative example embodiment of a replication data distribution system that utilizes a local update with a central mediator strategy within one embodiment of the presently preferred netcentric computing system illustrated in FIG. 1

FIG. 11 illustrates an exemplary embodiment that implements the presently preferred central site mediator. In the central site mediator implementation, the central database server 60 at the central site 70 acts as a mediator for a group of semi-autonomous local database servers 62 at a plurality of the local sites 72. This scenario allows the clients 14 associated with the local sites 72 to update the local databases within the corresponding local data stores 66 using the network 44 ("Local #1" and "Local #2" are updated in the example of FIG. 11). The replica data that has been updated is transferred via the network 44 to the central site 70. The central database server 60 at the central site 70 is operable to coordinate updates to the other local sites 72 and mediate conflicting updates to the central database within the central data store.

This conflict resolution mechanism may also require the addition of error processing. The rejection of an update from a particular local site 72 by the central database server 60 must be communicated to the local sites that initiated the update, typically as part of the workflow process. If the rejected update was made to the local database by the clients 14 associated with that local site 72, the rejected update will be lost when the replica data is distributed to the local database server 62 by the central database server 60. Accordingly, notification of the update failure must be performed. Those skilled in the art would understand that error-processing procedures add to the complexity of a central site mediator scenario. In addition, the complexity increases in magnitude when multiple transactions, affecting multiple rows, in multiple tables, that comprise a single logical unit of work (LUW) are added to the application.

Figure 12:
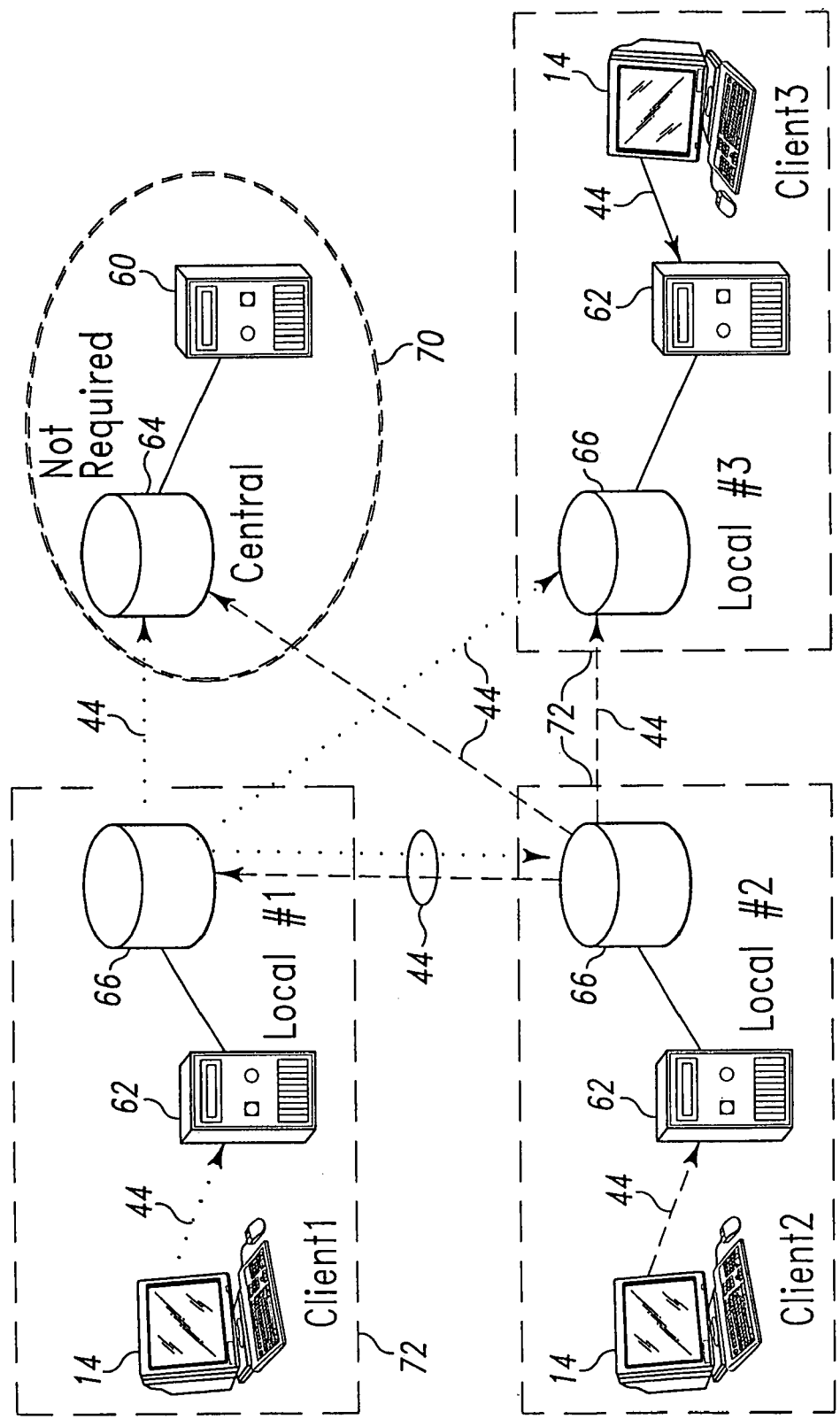
FIG. 12 is an illustrative example embodiment of a replication data distribution system that utilizes a local peer-to-peer update strategy within one embodiment of the presently preferred netcentric computing system illustrated in FIG. 1

In the presently preferred peer-to-peer database implementation illustrated in FIG. 12, all the databases in the netcentric computing system 12 are equal, there may be no central site 70 controlling the update process. Changes made to the replica data in the local data store 66 by the clients 14 associated with one of the local sites 72 (identified as "Local #1" and "Local #2" in the example illustrated in FIG. 12) are transmitted by the local database server 62 to all local data stores 66 containing the replica data that has been changed. Changes are transmitted over the network 44 as in the previously discussed embodiments. Those skilled in the art would understand that the central database server 60 and the central data store 64 is not required in this scenario, but it may be retained for the same sort of archiving and coordination activities described for local updates with no mediator previously discussed with reference to FIG. 10.

The presently preferred data distribution strategies provide the clients 14 within the netcentric computing system 12 with a data management system that can meet the business requirements of the enterprise. In addition, the distribution strategies can improve the reliability and operating efficiency of the netcentric computing system 12 while providing a distribution of data that is almost transparent to the clients 14. The segmentation and replication strategies provide data distribution solutions that provide cost effective solutions to maintain efficient operation of the netcentric computing system 12. In addition, the strategies are capable of providing for future expansion and the implementation of additional business requirements to meet the needs of the clients 14 within the netcentric computing system 12.

While the invention has been described in its currently best known modes of operation and embodiments, other modes and embodiments of the invention will be apparent to those skilled in the art and are contemplated. For other features, advantages and combinations of the present invention refer to U.S. Provisional Application Ser. No. 60/156,962, entitled NETCENTRIC AND CLIENT/SERVER COMPUTING, which is herein incorporated by reference, in its entirety.

What is claimed is:

1. A distributed data storage system for a netcentric computing system, comprising:
   a plurality of database servers;
   a plurality of data stores each in communication with one of the database servers, wherein the database servers are operable to access the data stores;
   a client communicating with the database servers, wherein each of the data stores includes a predetermined portion of the data used within the netcentric computing system;
   a central data store in communication with at least one of the database servers, wherein data representative of the predetermined portion of the data included in each of data stores also resides on the central data store,
   wherein the predetermined portion of the data in each of the data stores is a replicated portion of the data that resides on the central data store that has been segmented horizontally with a segmentation key, and also segmented vertically to form the predetermined portion of the data included in each of the data stores, wherein the segmentation key is operable to uniquely identify records in the central data store; and
   a webserver in communication with the client to act as the primary interface between and the client and the database servers.

2. The distributed data storage system of claim 1, wherein the client communicates with the database servers using a web browser application.

3. The distributed data storage system of claim 1, wherein the central data store is operable to store updates to the data until a pre-determined threshold of updates to the data is reached, one of the database servers in communication with the central data store operable to selectively publish the updates to the data stores to update the predetermined portion of data included in the respective one of the data stores, in response to the pre-determined threshold being reached.

4. The distributed data storage system of claim 3, wherein one of the database servers in communication with one of the data stores is subscribed to the one of the database servers in communication with the central data store, so that the one of the database servers in communication with one of the data stores operable to receive the published updates and re-publish the updates to the other databases servers subscribed thereto.

5. A segmented data distribution system for data accessed by clients in a netcentric computing system, comprising:
   a plurality of database servers;
   a plurality of data stores in communication with the database servers;
   a database located within each of the data stores, wherein the databases in each of the data stores are representative of a segment of data in the netcentric computing system, and wherein the data is horizontally segmented with a segmentation key and also vertically segmented to form the segment of data included in each of the databases, wherein the segmentation key is operable to uniquely define records across the database in each of the data stores;
   a network for communication with the database servers; and
   a webserver for communication within the network to provide access by the clients to the data.

6. The segmented data distribution system of claim 5, wherein one of the database servers is a central database server and one of the data stores is a central data store that is in communication with the central database server, and wherein the database included in the central data store replicates each database within the other data stores, and wherein changes to the database included within the central data store are storable as transaction updates that are publishable by the central database server for receipt by the other database servers when a predetermined threshold of transactions updates is reached, the other database servers subscribable to the central database server to monitor for relevant transaction updates.

7. A replicated data distribution system for data accessed by clients in a netcentric computing system, comprising:
   a central database server located at a central site;
   a central data store in communication with the central database server;
   a local database server located at a local site in communication with the central database server;
   a local data store in communication with the local database server wherein the local data store is populated with replica data of the data within the central data store, and wherein the central database server is operable to limit the replica data to a predetermined amount of data by horizontal segmentation of the data within the central data store based on a defining key uniquely definitive of records in the central data store and the local data store, and also by vertical segmentation of the data within the central data store;

wherein the central database server is further operable to store transaction related data updates in the central data store and publish the data updates to the local database server to update the replica data in the local data store in response to a predetermined threshold level of data updates being reached;

a network for communication with the local database server and the central database server; and a webserver for communication within the network to provide the primary interface for the clients to access the data within the netcentric computing system.

8. The replicated data distribution system of claim 7, wherein the communication between the central data base server and the local database server is via the network.

9. The replicated data distribution system of claim 7, wherein the replication is by unidirectional updates.

10. The replicated data distribution system of claim 7, wherein the replication is by bi-directional updates.

11. The replicated data distribution system of claim 7, wherein the central database server is further operable to publish only those transaction related updates that affect the replica data populated in the local data store.

12. A method of distributing data for use by clients in a netcentric computing system, comprising:

identifying the data needs of a plurality of data entity groups within the netcentric computing system;

identifying predetermined portions of the data to be used by the data entity groups;

segmenting the data horizontally with a segmentation key that identifies records within the data, and also vertically segmenting the data to obtain the identified predetermined portions;

replicating only the identified predetermined portions;

distributing the replicated predetermined portions of the data to a plurality of data stores;

communicating with the data stores with a plurality of database servers; and interfacing the database servers with the data entity groups using a webserver.

13. The method of claim 12, further comprising receiving a plurality of updates to the data, storing the updates until a predetermined threshold of updates is reached, and selectively distributing the updates to the corresponding data stores to update the replicated predetermined portions of the data.

14. The method of claim 13, further comprising receiving the distributed updates with one of the data stores and distributing the received updates with the one of the data stores to another of the data stores.

15. The method of claim 13, wherein distributing the updates comprises distributing the updates to only those data stores with replicated predetermined data to which the updates apply.

16. A method of distributing data for access by clients in a netcentric computing system, comprising:

determining a plurality of segmentation parameters that comprise a plurality segmentation keys that are each uniquely definitive of records included in the data;

performing vertical and horizontal segmentation of the data based on the segmentation parameters, wherein the horizontal segmentation is operable to identify records included in the data based on one of the segmentation keys;

storing the segmented data in a plurality of data stores;

communicating with the data stores with a plurality of database servers;

interfacing the database servers with a plurality of clients using a webserver; and selectively accessing the database servers depending on data requests initiated by the clients.

17. The method of claim 16 wherein the segmentation parameters comprise an origin, of the majority of the data requests.

18. The method of claim 16 wherein the segmentation parameters comprise determination of a plurality of related subject matter areas.

19. A method of distributing data for access by clients in a netcentric computing system, comprising:

storing data in a central database;

determining a plurality of segmentation keys that uniquely identify records included in the central database;

replicating a predetermined portion of the data by both horizontally and vertically segmenting the data to create replica data, wherein the horizontal segmentation is performed based on at least one of the segmentation keys;

transferring the replica data to a corresponding first local database and a second local database using a network;

updating the data in the central database;

storing the updates to the data in the central database until a predetermined threshold of updates is reached;

publishing the updates to the first local database with the central database in response to reaching the predetermined threshold;

the first local database publishing the updates to the second local database in response to receipt of the published updates from the central database; and accessing the data and the replica data using the network and a webserver.

20. The method of claim 19 further comprising the act of updating the data unidirectionally such that the first and second local databases are read only and updates to the replica data are performed in the central database.

21. The method of claim 20 further comprising the act of requesting an update to the replica data within the first and second local database from the central database.

22. The method of claim 20 further comprising the act of creating a snapshot of the data within the central database that corresponds to the replica data when the replica data is transferred.

23. The method of claim 20 further comprising the act of subsequently updating the first local database with replica data that is replicated from the central database following an update of the data in the central database that corresponds to the snapshot.

24. The method of claim 22 further comprising the act of subsequently updating the first local database only with changes to the replica data based on the snapshot.

25. The method of claim 19 further comprising the acts of monitoring the publications of replica data with a local database server, and updating the corresponding first or second local database with replica data when the replica data that was published is an update to the replica data in the first or second local database.

26. The method of claim 19 further comprising the act of updating the central database and the first and second local database using bi-directional replication.

27. The method of claim 19 further comprising the act of updating the central database and the first and second local database using selective replication.

28. The method of claim 19 further comprising the act of updating the central database with a remote log-on approach.

29. The method of claim 19 further comprising the act of updating the central database with a remote batch approach.

30. The method of claim 19 further comprising the act of updating the central database with a local checkout approach.

31. The method of claim 19 further comprising the act of updating the central database and the first and second local database using a local update strategy.

* * * * *

UNITED STATES PATENT AND TRADEMARK OFFICE
CERTIFICATE OF CORRECTION

PATENT NO. : 7,403,946 B1
APPLICATION NO. : 09/677134
DATED : July 22, 2008
INVENTOR(S) : Stanton J. Taylor It is certified that error appears in the above-identified patent and that said Letters Patent is hereby corrected as shown below:

Column 11
Line 42, delete "modern" and insert -- modem --.

Column 20
Line 44, insert -- which -- between "and" and "should".

Column 22
Line 24, insert -- is -- between "stores" and "operable".

Column 24
Line 51, delete "20" and insert -- 22 --.

Signed and Sealed this

Twenty-third Day of September, 2008

JON W. DUDAS
*Director of the United States Patent and Trademark Office*